United States Patent
Jeong et al.

(10) Patent No.: US 10,983,641 B2
(45) Date of Patent: Apr. 20, 2021

(54) TOUCH SENSING UNIT AND DISPLAY DEVICE WITH LINES IN THE PERIPHERAL AREA

(71) Applicant: SAMSUNG DISPLAY CO., LTD., Yongin-si (KR)

(72) Inventors: Hwan Hee Jeong, Cheonan-si (KR); Ki Cheol Kim, Yongin-si (KR); Jong Seon Park, Wonju-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/287,722

(22) Filed: Feb. 27, 2019

(65) Prior Publication Data
US 2020/0089351 A1 Mar. 19, 2020

(30) Foreign Application Priority Data

Sep. 19, 2018 (KR) .................. 10-2018-0112306

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *B32B 2457/208* (2013.01); *G06F 2203/04103* (2013.01); *G06F 2203/04112* (2013.01)

(58) Field of Classification Search
CPC .... G06F 3/041–047; G09G 2300/0426; G09G 2310/0281
See application file for complete search history.

(56) References Cited

U.S. PATENT DOCUMENTS

| | | | |
|---|---|---|---|
| 10,175,795 B2* | 1/2019 | Kurasawa | G02F 1/133 |
| 10,216,349 B2* | 2/2019 | Nakayama | G06F 3/0446 |
| 10,497,772 B2* | 12/2019 | Lhee | H01L 27/3288 |
| 10,579,170 B2* | 3/2020 | Wang | G02F 1/13452 |
| 2015/0160756 A1* | 6/2015 | Polishchuk | G06F 3/044 345/174 |
| 2016/0266713 A1* | 9/2016 | Hashida | G06F 3/047 |
| 2017/0083137 A1* | 3/2017 | Kurasawa | G02F 1/1343 |
| 2017/0139503 A1* | 5/2017 | Yoshiki | H05K 1/0274 |
| 2017/0249039 A1* | 8/2017 | Kim | G06F 3/0416 |
| 2018/0182822 A1* | 6/2018 | Seo | G06F 3/0416 |
| 2019/0056811 A1* | 2/2019 | Wang | G02F 1/13452 |
| 2019/0129551 A1* | 5/2019 | Lee | G06F 3/044 |

FOREIGN PATENT DOCUMENTS

KR 10-2013-0118072 10/2013

\* cited by examiner

*Primary Examiner* — Gene W Lee
(74) *Attorney, Agent, or Firm* — F. Chau & Associates, LLC

(57) ABSTRACT

A touch sensing unit includes a first touch electrode disposed in a touch sensor area. A second touch electrode is disposed in the touch sensor area. A first touch line is disposed in a touch peripheral area. The first touch line is electrically connected to the first touch electrode. The touch peripheral area is disposed on a periphery of the touch sensor area. A second touch line is disposed in the touch peripheral area. The second touch line is electrically connected to the second touch electrode. The touch peripheral area includes first and second regions. In the first region, a width of the first touch line is smaller than a width of the second touch line. In the second region, the width of the first touch line is equal to the width of the second touch line.

23 Claims, 29 Drawing Sheets

TOUCH SENSING UNIT AND DISPLAY DEVICE WITH LINES IN THE PERIPHERAL AREA

This application claims priority under 35 U.S.C. § 119 to Korean Patent Application No. 10-2018-0112306, filed on Sep. 19, 2018, the disclosure of which is herein incorporated by reference in its entirety.

TECHNICAL FIELD

The present disclosure relates to a display device and, more particularly, to a touch sensing unit and a display device including the same.

DISCUSSION OF THE RELATED ART

An electronic device capable of displaying an image, such as a smartphone, a tablet computer, a digital camera, a notebook computer, a satellite navigation device, a computer monitor, or a television (TV), includes a display device component for displaying an image. The display device component includes a display panel for generating and displaying an image and various input devices for registering a user's input.

For example, many display devices incorporate touch panels thereon for registering a user's touch. Such display devices may be referred to as touch screens. Touch screens have become very popular for use in smart phones. The touch panel detects touch input from a user and returns the location of the touch input as touch input coordinates.

The touch panel includes a plurality of touch electrodes and a plurality of touch lines connected to the touch electrodes. The touch lines have different lengths and may thus have different resistances. Accordingly, there may arise differences in the touch sensitivity of the touch electrodes.

SUMMARY

A touch sensing unit includes a first touch electrode disposed in a touch sensor area. A second touch electrode is disposed in the touch sensor area. A first touch line is disposed in a touch peripheral area. The first touch line is electrically connected to the first touch electrode. The touch peripheral area is disposed on a periphery of the touch sensor area. A second touch line is disposed in the touch peripheral area. The second touch line is electrically connected to the second touch electrode. The touch peripheral area includes first and second regions. In the first region, a width of the first touch line is smaller than a width of the second touch line. In the second region, the width of the first touch line is equal to the width of the second touch line.

A display device includes a substrate. A light-emitting element layer is disposed on the substrate and includes a plurality of organic light-emitting elements. A thin-film encapsulation layer is disposed on the light-emitting element layer. A touch sensor layer is disposed on the thin-film encapsulation layer. The touch sensor layer includes sensing electrodes disposed in the touch sensor area and sensing lines disposed in a touch peripheral area. The sensing lines are electrically connected to the sensing electrodes. The touch peripheral area is disposed on a periphery of the touch sensor area. A width of each of the sensing lines increases away from the touch sensor area. A width of each of the sensing lines disposed in a first row is smaller than a width of each of the sensing lines disposed in a second row.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
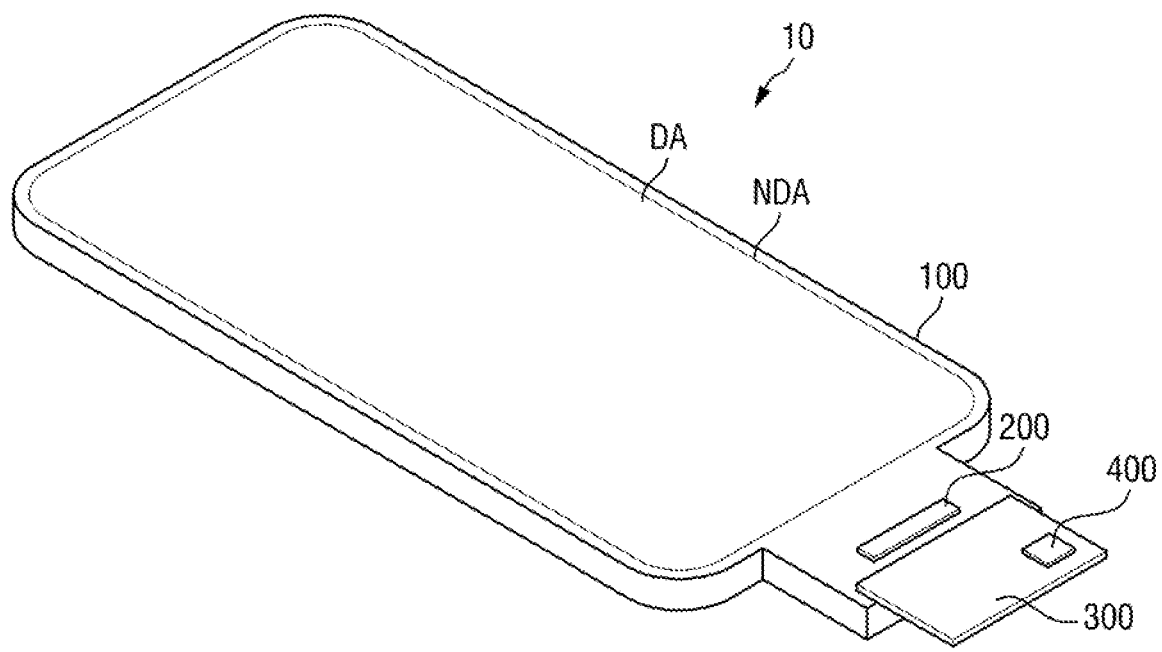
FIG. 1 is a perspective view illustrating a display device according to an exemplary embodiment of the present disclosure.

Exemplary embodiments of the present invention will now be described more fully hereinafter with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers may indicate the same components throughout the specification and the drawings. In the drawings, the thickness of layers and regions may be exaggerated for clarity, however, the figures are intended to show examples of relative sizes of various components and so, it is intended that the relative sizes, shapes and angles shown in the figures may be taken as exemplary limitations of various embodiments of the present invention.

It will also be understood that when a layer is referred to as being "on" another layer or substrate, it can be directly on the other layer or substrate, or intervening layers may also be present.

Hereinafter, exemplary embodiments of the present invention will be described with reference to the attached drawings.

Figure 2:
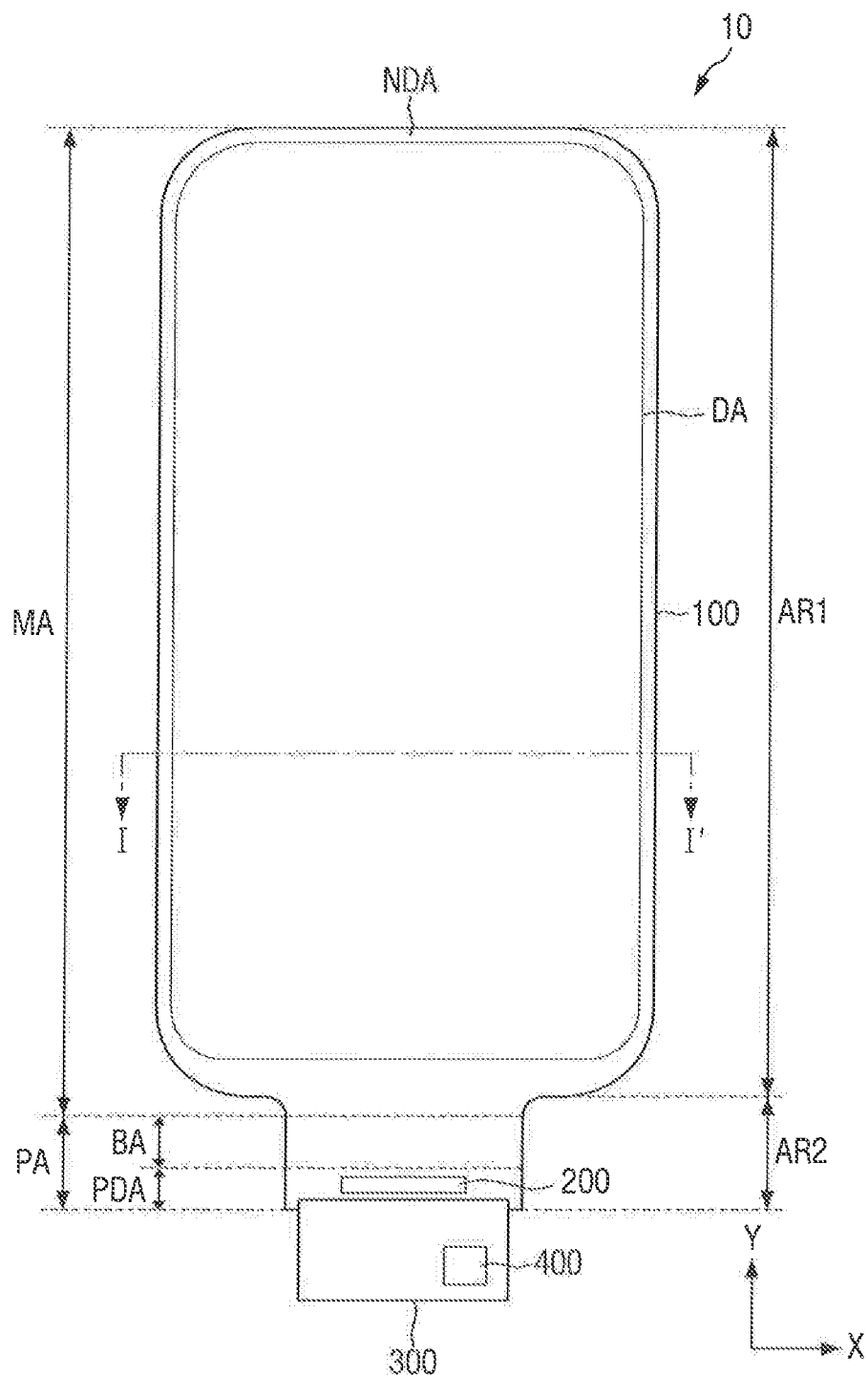
FIG. 2 is a plan view illustrating the display device of FIG. 1.
Figure 3A:
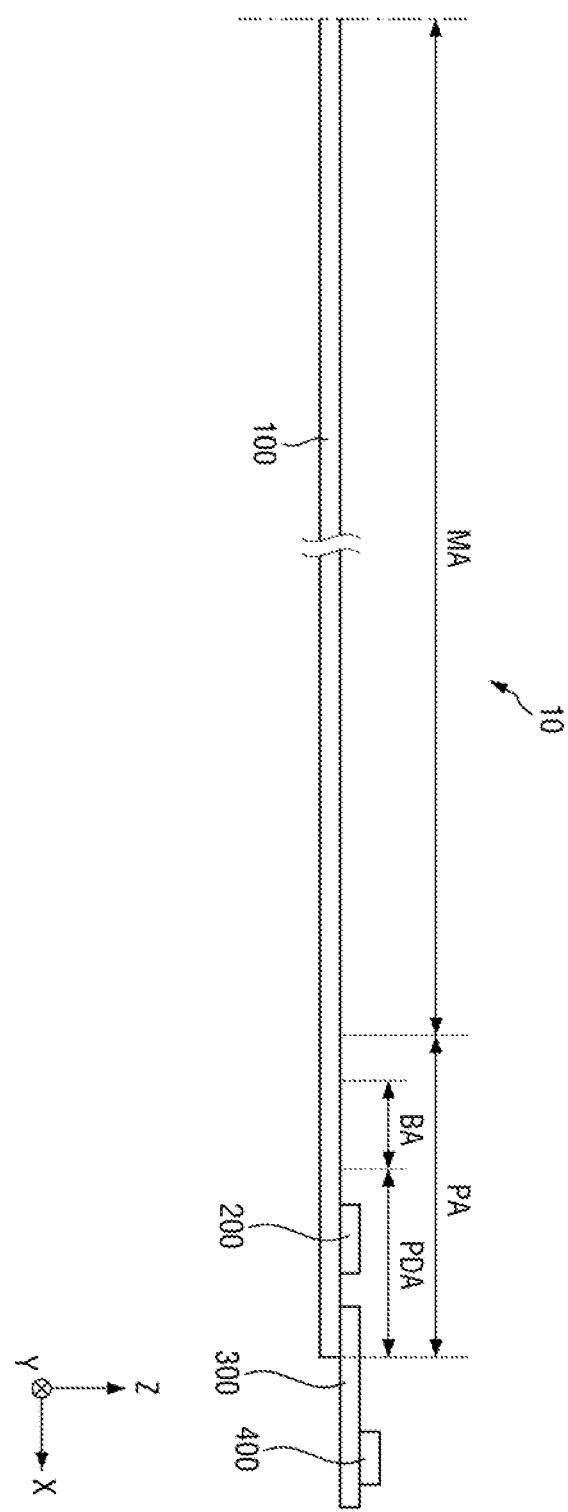
FIGS. 3A and 3B are side views illustrating the display device of FIG. 1.
Figure 3B:
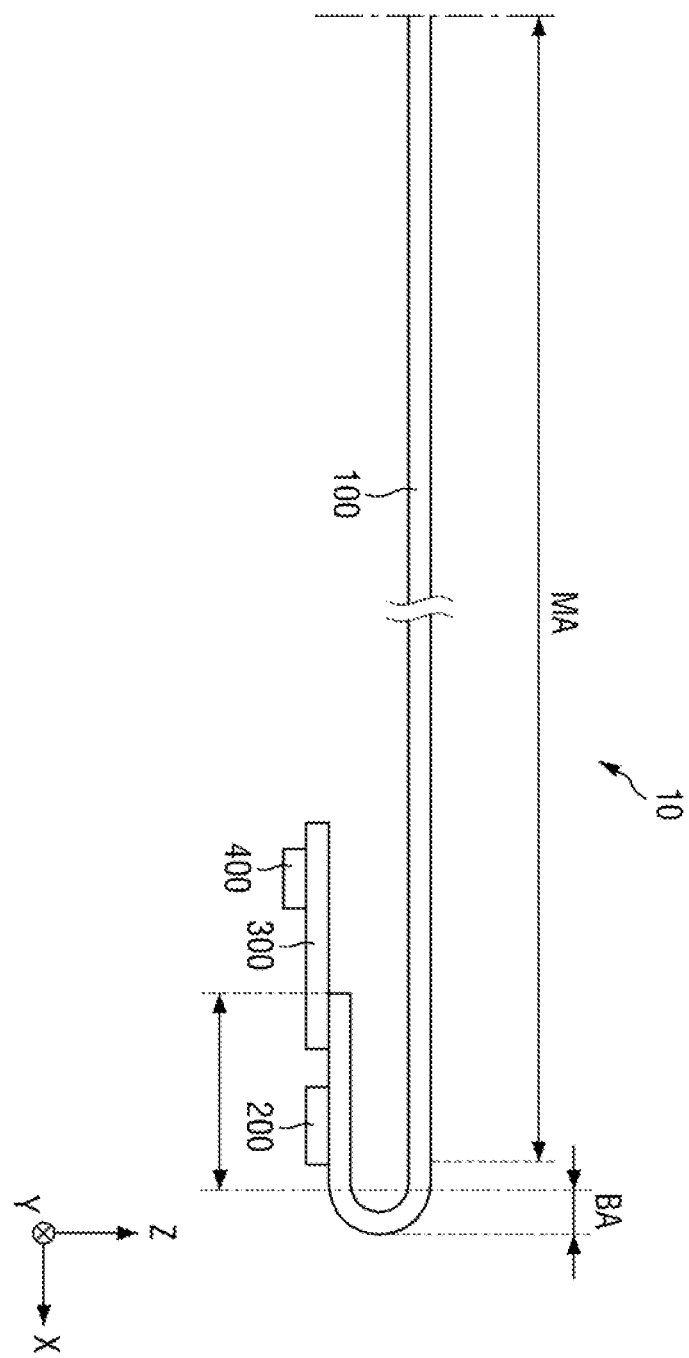

FIG. 1 is a perspective view of a display device according to an exemplary embodiment of the present disclosure. FIG. 2 is a plan view of the display device of FIG. 1. FIGS. 3A and 3B are side views of the display device of FIG. 1.

The terms "above", "top", and "top surface", as used herein, denote an upper direction from a display panel 100, e.g., a Z-axis direction, and the terms "below", "bottom", and "bottom surface", as used herein, denote a downward direction from the display panel 100, e.g., a direction opposite to the Z-axis direction. Also, the terms "left", "right", "upper", and "lower", as used herein, denote their respective directions when the display panel 100 is viewed from above. For example, the term "left" refers to a direction opposite to an X-axis direction, the term "right" refers to the X-axis direction, the term "upper" refers to a Y-axis direction, and the term "lower" refers to a direction opposite to the Y-axis direction.

Referring to FIGS. 1, 2, 3A, and 3B, a display device 10 is shown. The display device 10 is a device for displaying a moving image or a still image. The display device 10 may be used in a portable electronic device such as a mobile phone, a smartphone, a tablet computer, a smart watch, a watch phone, a mobile communication terminal, an electronic notebook, an electronic book, a portable multimedia player (PMP), a satellite navigation device, a notebook computer, or an ultra-mobile PC (UMPC). Alternatively, the display device 10 may be incorporated into stationary products such as a television (TV), a computer monitor, a billboard, or an Internet-of-Things (IoT) device. The display device 10 may be an organic light-emitting diode (OLED) display device, a liquid crystal display (LCD) device, a plasma display device, a field emission display (FED) device, an electrophoretic display (EPD) device, an electrowetting display device, a quantum dot light-emitting diode (QLED) display device, or a micro light-emitting diode (mLED) display device. The display device 10 will hereinafter be described as being an OLED display device, but the present disclosure is not limited thereto.

The display device 10 includes a display panel 100, a display driving circuit 200, a circuit board 300, and a touch driving circuit 400.

The display panel 100 may include a main area MA and a peripheral area PA.

The main area MA may be flat and may have a substantially rectangular shape in a plan view. The main area MA may have a pair of short sides extending in a first direction (e.g. the X-axis direction) and a pair of long sides extending in a second direction (e.g. the Y-axis direction), which intersects the first direction, for example, at a right angle. The corners where the short sides and the long sides of the main area MA meet may be either rounded or right-angled. The shape of the main area MA of the display device 10 is not limited to a rectangular shape, and the display device 10 may be formed in various other polygonal shapes or in a circular or elliptical shape.

The main area MA may be flat (e.g. planar), but the present disclosure is not limited thereto. Alternatively, the main area MA may include curved parts formed at left and right ends thereof, in which case, the curved parts may have a uniform curvature or a variable curvature. For example, one or more edges of the main area MA may be curved back.

The main area MA may include a display area DA in which pixels are formed to display an image and a non-display area NDA in which pixels are absent. The non-display area NDA may be on the periphery of the display area DA and may at least partially surround the display area DA.

In the display area DA may include the pixels, as well as scan lines, data lines, and power lines connected to the pixels. Where the main area MA includes curved parts, the display area DA may also be provided on the curved parts of the main area MA, in which case, an image displayed by the display panel 100 can be viewed on the curved parts of the main area MA. For example, where the main area MA is curved back, the display area DA may also be curved back so that a displayed image may extend to the curved back regions of the display area DA.

The non-display area NDA may be defined as ranging from the edges of the display area DA to the edges of the display panel 100. In the non-display area NDA, a scan driver for applying scan signals to the scan lines and link lines for connecting the data lines and the display driving circuit 200 may be disposed.

The display panel 100 includes a first area AR1 having a first length in the first direction (e.g. the X-axis direction) and a second AR2 having a second length in the first direction smaller than the first length. The second area AR2 may protrude from one side of the first area AR1. For example, as illustrated in FIG. 2, the second are AR2 may protrude from the lower side of the first area AR1. The main area MA may include the first area AR1 and a portion of the second area AR2. The peripheral area PA may include the rest of the second area AR2. The portion of the second area AR2 is smaller than the rest of the second area AR2.

The peripheral area PA may include a bending area BA and a pad area PDA. The pad area PDA may be disposed on one side of the bending area BA, and the main area MA may be disposed on the other (e.g. opposite) side of the bending area BA. For example, the pad area FDA may be disposed on the lower side of the bending area BA, and the main area MA may be disposed on the upper side of the bending area BA.

The display panel 100 may be flexible and may thus be bendable, foldable, or rollable. As used herein, the terms "flexible, bendable, foldable, and rollable are intended to signify that the display panel 100 may be flexed, bent, folded, or rolled without breaking. Accordingly, the display panel 100 can be bent in the bending area BA in a thickness direction (e.g. the Z-axis direction). When the display panel 100 is unbent, the pad area PDA of the display panel 100 faces upward, as illustrated in FIG. 3A. Once the display panel 100 is bent, the pad area PDA of the display panel 100 may face downward, as illustrated in FIG. 3B. As a result, as illustrated in FIG. 3B, the pad area PDA may be disposed below the main area MA and may thus overlap with the main area MA.

Figure 4:
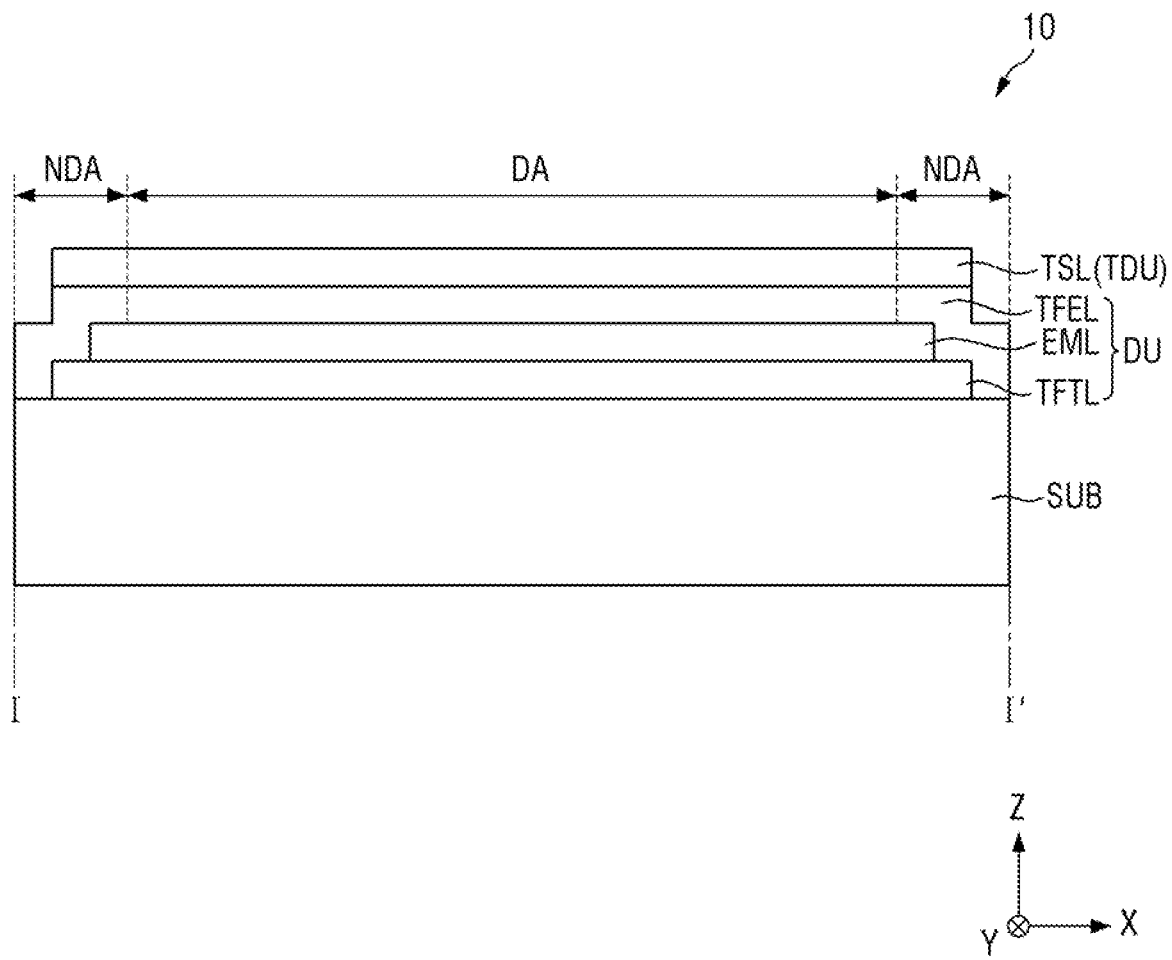
FIG. 4 is a cross-sectional view taken along line I-I' of FIG. 2.

Referring to FIG. 4, the display panel 100 may include a display unit DU, and the display unit DU may include a thin-film transistor (TFT) layer TFTL, a light-emitting element layer EML, and a thin-film encapsulation layer TFEL. FIG. 4 illustrates an example in which a touch sensing unit TDU having a touch sensor layer TSL is included in the display panel 100, but the present disclosure is not limited to this example. For example, the touch sensing unit TDU may be formed as a separate touch panel, in which case, the touch panel may be formed separately and then attached to the display panel 100.

In the pad area PDA of the display panel 100, pads electrically connected to the display driving circuit 200 and the circuit board 300 may be disposed.

The display driving circuit 200 may output signals and voltages for driving the display panel 100. For example, the display driving circuit 200 may provide data voltages to the data lines. Also, the display driving circuit 200 may provide power voltages to the power lines and may also provide scan control signals to the scan driver. The display driving circuit 200 may be formed as an integrated circuit (IC) and may be mounted on the display panel 100 in the pad area PDA in a chip-on-glass (COG), chip-on-plastic (COP), ultrasonic bonding manner, or by some other means, but the present disclosure is not limited thereto. For example, the display driving circuit 200 may be mounted on the circuit board 300.

The pads of the pad area PDA may include display pads electrically connected to the display driving circuit 200 and touch pads electrically connected to touch lines.

The circuit board 300 may be attached to the pads via an anisotropic conductive film. As a result, the conductive lines of the circuit board 300 may be electrically connected to the pads. The circuit board 300 may include a flexible film and may be a flexible printed circuit board, a printed circuit board, or a chip-on-film.

The touch driving circuit 400 may be connected to touch electrodes of the touch sensor layer TSL of the display panel 100. The touch driving circuit 400 applies a driving signal to the touch electrodes of the touch sensor layer TSL and measures the capacitance of the touch electrodes. The driving signal may be a signal having multiple driving pulses. The touch driving circuit 400 can determine the presence of touch input based on the capacitance of the touch electrodes, and may also be able to calculate the touch coordinates of touch input.

The touch driving circuit 400 may be disposed on the circuit board 300. The touch driving circuit 400 may be formed as an IC and may be mounted on the circuit board 300.

FIG. 4 is a cross-sectional view taken along line I-I' of FIG. 2.

Referring to FIG. 4, the display panel 100 may include a substrate SUB, the display unit DU, which is disposed on the substrate SUB and includes the TFT layer TFTL, the light-emitting element layer EML, and the thin-film encapsulation layer TFEL, and the touch sensing unit TDU, which includes the touch sensor layer TSL.

The substrate SUB may include an insulating material such as glass, quartz, a polymer resin, etc. The polymer material may be polyethersulfone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof. Alternatively, the substrate SUB may include a metal material.

The substrate SUB may be a rigid substrate or a flexible substrate that is bendable, foldable, or rollable. Where the substrate SUB is a flexible substrate, the substrate SUB may include PI, but the present disclosure is not limited thereto.

Figure 5:
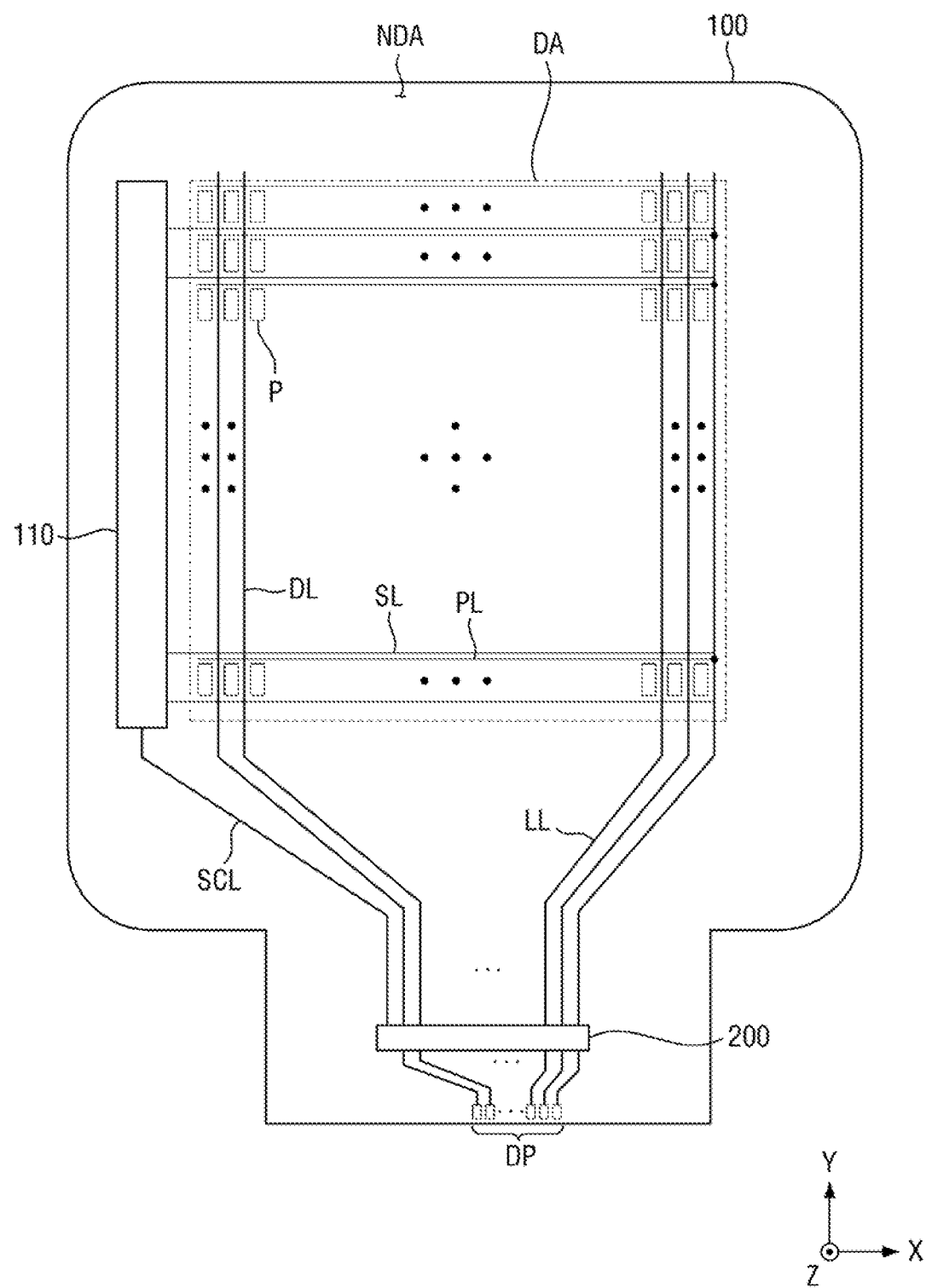
FIG. 5 is a plan view illustrating an example of a display unit of FIG. 4.

The TFT layer TFTL may be disposed on the substrate SUB. In the TFT layer TFTL, the TFTs of the pixels, the scan lines, the data lines, the power lines, scan control lines, the link lines for connecting the pads, and the data lines may all be formed. Each of the TFTs of the pixels may include a gate electrode, a semiconductor layer, a source electrode, and a drain electrode. Where the scan driver is formed in the non-display area NDA of the display panel 100, as illustrated in FIG. 5, the scan driver may include TFTs.

The TFT layer TFTL may be disposed in the display area DA and in the non-display area NDA. For example, the TFTs of the pixels, the scan lines, the data lines, and the power lines of the TFT layer TFTL may be disposed in the display area DA. The scan control lines and the link lines of the TFT layer TFTL may be disposed in the non-display area NDA.

The light-emitting element layer EML may be disposed on the TFT layer TFTL. The light-emitting element layer EML may include the pixels, each including a first electrode, a light-emitting layer, and a second electrode, and a pixel defining film defining the pixels. The light-emitting layer may be an organic light-emitting layer including an organic material, in which case, the light-emitting layer may include a hole transport layer, an organic light-emitting layer, and an electron transport layer. In response to a predetermined voltage being applied to the first electrode via each of the TFTs of the TFT layer TFTL and a cathode voltage being applied to the second electrode, holes and electrons may move to the organic light-emitting layer via the hole transport layer and the electron transport layer and may combine within the organic light-emitting layer to emit light. The pixels of the light-emitting element layer EML may be disposed in the display area DA.

The thin-film encapsulation layer TFEL may be disposed on the light-emitting element layer EML. The thin-film encapsulation layer TFEL prevents the infiltration of oxygen or moisture into the light-emitting element layer EML. To this end, the thin-film encapsulation layer TFEL may include at least one inorganic film. The inorganic film may include a silicon nitride layer, a silicon oxynitride layer, a silicon oxide layer, a titanium oxide layer, and/or an aluminum oxide layer, but the present disclosure is not limited thereto. Also, the thin-film encapsulation layer TFEL protects the light-emitting element layer EML against foreign materials such as dust. The thin-film encapsulation layer TFEL may further include at least one organic film. The organic film may include an acrylic resin, an epoxy resin, a phenolic resin, a polyamide resin, and/or a PI resin, but the present disclosure is not limited thereto.

The thin-film encapsulation layer TFEL may be disposed in both the display area DA and the non-display area NDA. For example, the thin-film encapsulation layer TFEL may cover the light-emitting element layer EML in the display area DA and the non-display area NDA and may also cover the TFT layer TFTL in the non-display area NDA.

The touch sensor layer TSL may be disposed on the thin-film encapsulation layer TFEL. When the touch sensor layer TSL is disposed directly on the thin-film encapsulation layer TFEL, the thickness of the display device 10 can be reduced, as compared to when a separate touch panel including the touch sensor layer TSL is attached on the thin-film encapsulation layer TFEL.

The touch sensor layer TSL may include touch electrodes for detecting touch input from a user in a capacitive manner and touch lines for connecting pads and the touch electrodes. For example, the touch sensor layer TSL may detect touch input from the user in a self-capacitance manner or in a mutual capacitance manner.

The touch electrodes of the touch sensor layer TSL may be disposed in the display area DA. The touch lines of the touch sensor layer TSL may be disposed in the non-display area NDA.

A cover window may be additionally disposed on the touch sensor layer TSL. Where a cover window is used, the touch sensor layer TSL and the cover window may be attached to each other via a transparent adhesive member.

FIG. 5 is a plan view illustrating an example of the display unit of FIG. 4. For the convenience of illustration, FIG. 5 shows only pixels P, scan lines SL, data lines DL, power lines PL, scan control lines SCL, a scan driver 110, the display driving circuit 200, and display pads DP of the display unit DU. However, it is to be understood that various other elements may be present, as would be understood by one of ordinary skill in the art.

Referring to FIG. 5, the scan lines SL, the data lines DL, the power lines PL, and the pixels P are disposed in the display area DA. The scan lines SL may be formed side-by-side in the first direction (e.g. the X-axis direction), and the data lines DL may be formed side-by-side in the second direction (e.g. the Y-axis direction). The power lines PL may include at least one line formed in parallel to the data lines DL and a plurality of lines branched off from the at least one line in the first direction (e.g. the X-axis direction).

Each of the pixels P may be connected to at least one of the scan lines SL, one of the data lines DL, and the power lines PL. Each of the pixels P may include TFTs, including a driving transistor and at least one switching transistor, an OLED, and a capacitor. In response to scan signals being applied via the scan lines SL, the pixels P may receive data voltages via the data lines DL and may emit light by supplying a driving current to the OLEDs thereof in accordance with the data voltages applied to the gate electrodes thereof.

The scan driver 110 may be connected to the display driving circuit 200 via at least one scan control line SCL. As a result, the scan driver 110 may receive scan control signals from the display driving circuit 200. The scan driver 110 may generate scan signals in accordance with the scan control signals and may provide the scan signals to the scan lines SL.

FIG. 5 illustrates an example in which the scan driver 110 is formed in a part of the non-display area NDA on the left side of the display area DA, but the present disclosure is not limited thereto. For example, the scan driver 110 may be formed in parts of the non-display area NDA on both the left and right sides of the display area DA.

The display driving circuit 200 is connected to the display pads DP and thus receives digital video data and timing signals. The display driving circuit 200 converts the digital video data into positive/negative analog data voltages and provides the positive/negative analog data voltages to the data lines DL via the link lines LL. Also, the display driving circuit 200 generates scan control signals for controlling the scan driver 110 and provides the scan control signals via the scan control lines SCL. Pixels P to which data voltages are to be provided are selected by the scan signals generated by the scan driver 110, and data voltages are provided to the selected pixels P. The display driving circuit 200 may be formed as an IC and may be attached on the substrate SUB in a COG, COP, or ultrasonic bonding manner.

Figure 6:
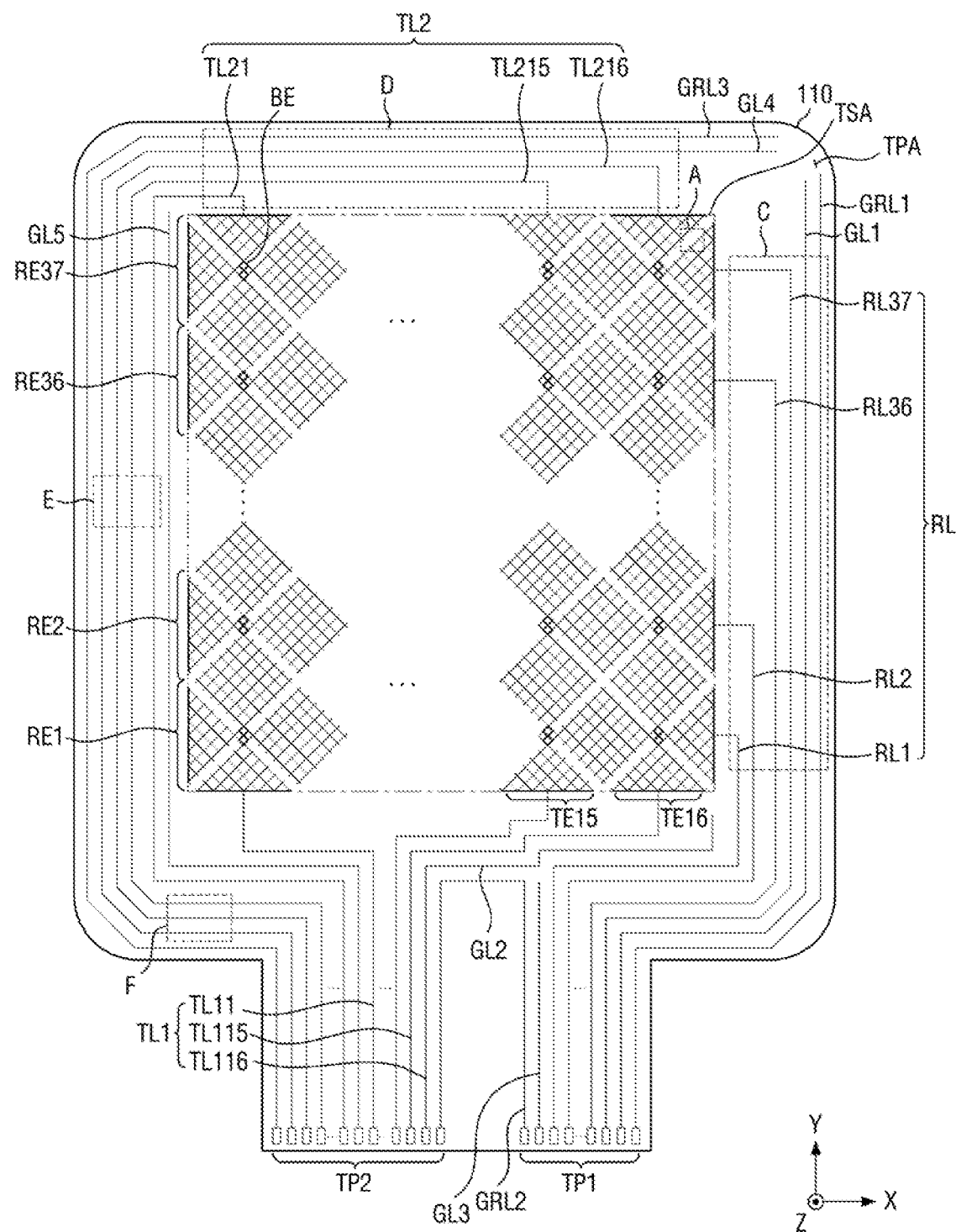
FIG. 6 is a plan view illustrating an example of a touch sensing unit of FIG. 4.

FIG. 6 is a plan view illustrating an example of the touch sensing unit of FIG. 4. For the convenience of illustration, FIG. 6 illustrates only touch electrodes (TE and RE), touch lines (TL and RL), and touch pads TP. However, it is to be understood that various other elements may be present, as would be understood by one of ordinary skill in the art.

Referring to FIG. 6, the touch sensing unit TDU includes a touch sensor area TSA for detecting touch input from the user and a touch periphery area TPA disposed on the periphery of the touch sensor area TSA. The touch sensor area TSA may at least partially overlap with the display area DA of the display unit DU, and the touch periphery area TPA may at least partially overlap with the non-display area NDA of the display unit DU.

The touch electrodes (TE and RE) may be disposed in the touch sensor area TSA. The touch electrodes (TE and RE) may include sensing electrodes RE electrically connected to one another in the first direction (e.g. the X-axis direction) and driving electrodes DE electrically connected to one another in the second direction (e.g. the Y-axis direction). FIG. 6 illustrates an example in which the sensing electrodes RE and the driving electrodes TE have a diamond shape in a plan view, but the present disclosure is not limited thereto.

To prevent the sensing electrodes RE and the driving electrodes TE from being short-circuited at the intersections between the sensing electrodes RE and the driving electrodes TE, pairs of adjacent driving electrodes TE in the second direction (e.g. the Y-axis direction) may be electrically connected via connecting electrodes BE. In this case, the driving electrodes TE and the sensing electrodes RE may be disposed in a single layer, and the connecting electrodes BE may be disposed in a different layer from the driving electrodes TE and the sensing electrodes RE. The sensing electrodes RE, which are electrically connected to one another in the first direction (e.g. the X-axis direction), may be electrically insulated from the driving electrodes TE, which are electrically connected to one another in the second direction (e.g. the Y-axis direction). The touch lines (TL and RL) may be disposed in the touch periphery area TPA. The touch lines (TL and RL) may include sensing lines RL connected to the sensing electrodes RE and first driving lines TL1 and second driving lines TL2 connected to the driving electrodes TE.

For example, sensing electrodes RE disposed at a first end of the touch sensor area TSA may be connected to the sensing lines RL. One of sensing electrodes RE electrically connected in the first direction (e.g. the X-axis direction) may be connected to a sensing line RL at the first end of the touch sensor area TSA. The sensing lines RL may be connected to first touch pads TP1. Driving electrodes TE disposed at a second end of the touch sensor area TSA may be connected to the first driving lines TL1, and driving electrodes TE disposed at a third end of the touch sensor area TSA, that is opposite to the second end of the touch sensor area TSA, may be connected to the second driving lines TL2. One driving electrode TE of driving electrodes TE electrically connected in the second direction (e.g. the Y-axis direction) may be connected to a first driving line TL1 at the second end of the touch sensor area TSA. Another driving electrode TE of driving electrodes TE electrically connected in the second direction (e.g. the Y-axis direction) may be connected to a second driving line TL2 at the third end of the touch sensor area TSA. For example, the first driving lines TL1 may be connected to the driving electrodes TE on the lower side of the touch sensor area TSA, and the second driving lines TL2 may be connected to the driving electrodes TE on the upper side of the touch sensor area TSA. In this example, the second driving lines TL2 may be connected to the driving electrodes TE via the left side of the touch sensor area TSA. The first driving lines TL1 and the second driving lines TL2 may be connected to second driving pads TP2. As a result, the touch driving circuit 400 may be electrically connected to the driving electrodes TE and the sensing electrodes RE.

The touch electrodes (TE and RE) may be driven in a mutual capacitance manner or a self-capacitance manner. Where the touch electrodes (TE and RE) are driven in a mutual capacitance manner, mutual capacitance at the intersections between the sensing electrodes RE and the driving electrodes TE may be charged by applying the driving signal to the driving electrodes TE via the first driving lines TL1 and the second driving lines TL2. Then, charge variations in the sensing electrodes RE may be measured via the sensing lines RL, and the presence of touch input may be determined based on the measured charge variations. The driving signal may be a signal having multiple driving pulses.

Where the touch electrodes (TE and RE) are driven in a self-capacitance manner, the self-capacitance of the driving electrodes TE and the sensing electrodes RE may be charged by applying the driving signal to both the driving electrodes TE and the sensing electrodes RE via the first driving lines TL1, the second driving lines TL2, and the sensing lines RL. Then, charge variations in the driving electrodes TE and the sensing electrodes may be measured via the first driving lines TL1, the second driving lines TL2, and the sensing lines RL, and the presence of touch input may be determined based on the measured charge variations.

Figure 7:
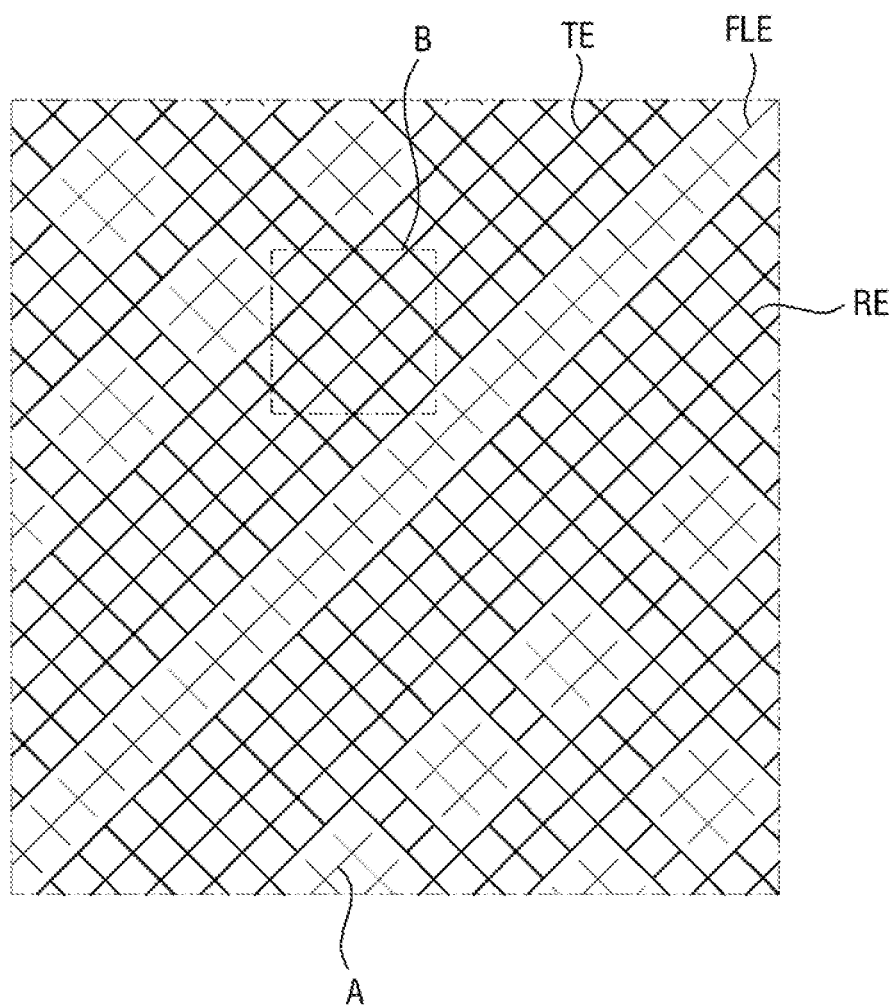
FIG. 7 is an enlarged plan view illustrating an example of an area A of FIG. 6.

The driving electrodes TE and the sensing electrodes RE may be formed as mesh-type electrodes, as illustrated in FIG. 7. Where the touch sensor layer TSL including the driving electrodes TE and the sensing electrodes RE is formed directly on the thin-film encapsulation film TFEL, as illustrated in FIG. 4, parasitic capacitance generated between the second electrodes of the light-emitting element layer EML and the driving electrodes TE (e.g. the sensing electrodes RE) of the touch sensor layer TSL may become relatively large because the second electrodes of the light-emitting element layer EML are relatively close to the driving electrodes TE (e.g. the sensing electrodes RE) of the touch sensor layer TSL. To reduce such parasitic capacitance, the driving electrodes TE and the sensing electrodes RE may be formed as mesh-type electrodes, as illustrated in FIG. 6, rather than being formed as non-patterned electrodes using a transparent oxide conductive layer such as indium tin oxide (ITO) or indium zinc oxide (IZO).

Floating electrodes FLE may be spaced apart from the driving electrodes TE and the sensing electrodes RE, as illustrated in FIG. 7. The floating electrodes FLE may be disposed between the driving electrodes TE and the sensing electrodes RE or may be at least partially surrounded by the driving electrodes TE or the sensing electrodes RE. The floating electrodes FLE may be formed as mesh-type electrodes. No voltages are applied to the floating electrodes FLE. As the area of the floating electrodes FLE increases, the parasitic capacitance between the second electrodes of the light-emitting element layer EML and the driving electrodes TE (e.g. the sensing electrodes RE) of the touch sensor layer TSL may decrease, and the mutual capacitance between the driving electrodes TE and the sensing electrodes RE may also decrease. When parasitic capacitance decreases, the speed at which to charge mutual capacitance can be raised, but as mutual capacitance decreases, the influence of touch noise may undesirably increase. Thus, the area of the floating electrodes FLE may preferably be set in consideration of parasitic capacitance and mutual capacitance.

For the convenience of description, an arbitrary row of sensing electrodes RE arranged in the first direction (e.g. the X-axis direction) and a sensing line RL connected to the arbitrary row of sensing electrodes will be defined as a j-th row of sensing electrodes REj (where j is a positive integer) and a j-th sensing line RLj, respectively. Accordingly, a sensing line RL connected to a first row of sensing electrodes RE1 may be a first sensing line RL1, a sensing line RL connected to a second row of sensing electrodes RE2 may be a second sensing line RL2, a sensing line RL connected to a thirty sixth row of sensing electrodes RE36 may be a thirty sixth sensing line RL36, and a sensing line RL connected to a thirty seventh row of sensing electrodes RE37 may be a thirty seventh sensing line RL37. The first row of sensing electrodes RE1 may be the lowermost row of sensing electrodes RE, and the thirty seventh row of sensing electrodes RE37 may be the uppermost row of sensing electrodes RE. FIG. 6 illustrates an example in which there are provided a total of 37 rows of sensing electrodes RE, but the number of rows of sensing electrodes RE is not particularly limited. The first sensing line RL1 may be closest to the touch sensor area TSA, and the thirty seventh sensing line RL37 may be farthest from the touch sensor area TSA.

The thirty seventh row of sensing electrodes RE37 may be farthest from the first touch pads TP1, and the first row of sensing electrodes RE1 may be closest to the first touch pads TP1. Accordingly, the thirty seventh sensing line RL37 may be longest, and the first sensing line RL1 may be shortest.

For the convenience of description, an arbitrary column of driving electrodes TE arranged in the second direction (e.g. the Y-axis direction), a driving line TL connected to one side of the arbitrary column of driving electrodes TE, and a driving line TL connected to the other side of the arbitrary column of driving electrodes TE will be defined as a k-th column of driving electrodes TEk (where k is a positive integer), a (1-k)-th driving line TL1$k$, and a (2-k)-th driving line TL2$k$. In this case, a driving line TL connected to one side of a first column of driving electrodes TE1 may be a (1-1)-th driving line TL1. A driving line TL connected to the other side of the first column of driving electrodes TE1 may be a (2-1)-th driving line TL21. A driving line TL connected to one side of a second column of driving electrodes TE2 may be a (1-2)-th driving line TL12. A driving line TL connected to the other side of the second column of driving electrodes TE2 may be a (2-2)-th driving line TL22. A driving line TL connected to one side of a fifteenth column of driving electrodes TE15 may be a (1-15)-th driving line TL115. A driving line TL connected to the other side of the fifteenth column of driving electrodes TE15 may be a (2-15)-th driving line TL215. A driving line TL connected to one side of a sixteenth column of driving electrodes TE16 may be a (1-16)-th driving line TL16. A driving line TL connected to the other side of the sixteenth column of driving electrodes TE16 may be a (2-16)-th driving line TL216. Here, the first column of driving electrodes TE1 may be the leftmost column of driving electrodes TE, and the sixteenth column of driving electrodes TE16 may be the rightmost column of driving electrodes TE. FIG. 6 illustrates an example in which there are provided a total of 16 columns of driving electrodes TE, but the number of columns of driving electrodes TE is not particularly limited. The (2-1)-th driving line TL21 may be closest to the touch sensor area TSA, and the (2-16)-th driving line TL216 may be farthest from the touch sensor area TSA.

The upper side of the sixteenth column of driving electrodes TE116 may be farthest from the second touch pads TP2, and the upper side of the first column of driving electrodes TE1 may be closest to the second touch pads TP2. Accordingly, the (2-16)-th driving line TL216 may be longest, and the (2-1)-th driving line TL21 may be shortest.

A first guard line GL1 may be disposed on the outside of the thirty seventh sensing line RL37, which is the outermost sensing line RL A first ground line GRL1 may be disposed on the outside of the first guard line GL1. For example, since of all the sensing lines RL, the thirty seventh sensing line RL37 is disposed at the rightmost side of the display panel 100, the first guard line GL1 may be disposed on the right side of the thirty seventh sensing line RL37, and the first ground line GRL1 may be disposed on the right side of the first guard line GL1.

A second guard line GL2 may be disposed between the first sensing line RL1, which is the innermost sensing line RL, and the (1-16)-th driving line TL116. Also, the second guard line GL2 may be disposed between the (1-16)-th driving line TL116 and a second ground line GRL2. A third guard line GL3 may be disposed between the first sensing line RL1 and the second ground line GRL2. The second ground line GRL2 may be connected to an innermost first touch pad TP1 and an innermost second touch pad TP2.

A fourth guard line GL4 may be disposed on the outside of the (2-16)-th driving line TL216, which is the outermost second driving line TL2. A third ground line GRL3 may be disposed on the outside of the fourth guard line GL4. For example, since the (2-16)-th driving line TL216 is the leftmost and uppermost second driving line TL2, the fourth guard line GL4 may be disposed on the left and upper sides of the (2-16)-th driving line TL216, and the third ground line GRL3 may be disposed on the left and upper sides of the fourth guard line GL4.

A fifth guard line GL5 may be disposed on the inside of the (2-1)-th driving line TL21, which is the innermost second driving line TL2. For example, the fifth guard line GL5 may be disposed between the (2-1)-th driving line TL21 and the touch electrodes (TE and RE).

In the exemplary embodiment shown in FIG. 6, the first, second, and third guard lines GRL1, GRL2, and GRL3 are disposed at uppermost, leftmost, and rightmost parts of the display panel 100. A ground voltage is applied to the first, second, and third ground lines GRL1, GRL2, and GRL3. As a result, when static electricity is applied from the outside, the static electricity can be discharged via the first, second, and third ground lines GRL1, GRL2, and GRL3.

Also, in the exemplary embodiment of FIG. 6, since the first guard line GL1 is disposed between the outermost sensing line RL, e.g., the thirty seventh sensing line RL37, and the first ground line GRL1, the first guard line GL1 may minimize the influence of voltage variations in the first ground line GRL1 on the thirty seventh sensing line RL37. Also, since the second guard line GL2 is disposed between the innermost sensing line RL, e.g., the first sensing line RL1, and the outermost first driving line TL1, e.g., the (1-16)-th driving line TL116, the second guard line GL2 may minimize the influence of the first sensing line RL1 and the (1-16)-th driving line TL116 on each other. Also, since the third guard line GL3 is disposed between the innermost sensing line RL, e.g., the first sensing line RL1, and the second ground line GRL2, the third guard line GL3 may minimize the influence of voltage variations in the second ground line GRL2 on the first sensing line RL1. Also, since the fourth guard line GL4 is disposed between the outermost second driving line TL2, e.g., the (2-16)-th driving line TL216, and the third ground line GRL3, the fourth guard line GL4 may minimize the influence of voltage variations in the third ground line GRL3 on the (2-16)-th driving line TL216. Also, since the fifth guard line GL5 is disposed between the innermost second driving line TL2, e.g., the (2-1)-th driving line TL21, and the touch electrodes (TE and RE), the fifth guard line GL5 may minimize the influence of the (2-1)-th driving line TL21 and the touch electrodes (TE and RE) on each other.

Where the touch electrodes (TE and RE) are driven in a mutual capacitance manner, a ground voltage may be applied to the first, second, third, fourth, and fifth guard lines GL1, GL2, GL3, GL4, and GL5. Also, where the touch electrodes (TE and RE) are driven in a self-capacitance manner, the same driving signal as that applied to the first driving lines TL1, the second driving lines TL2, and the sensing lines RL may be applied to the first, second, third, fourth, and fifth guard lines GL1, GL2, GL3, GL4, and GL5.

Figure 8:
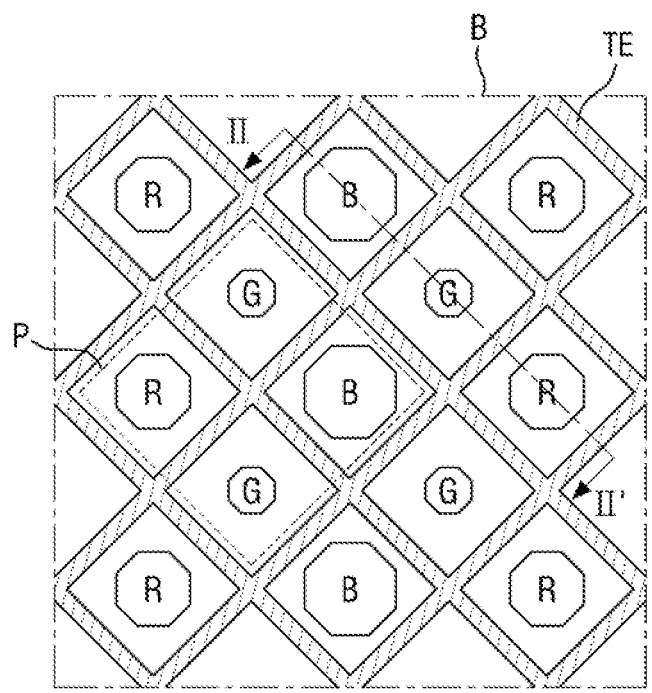
FIG. 8 is an enlarged plan view illustrating an example of an area B of FIG. 7.
Figure 9:
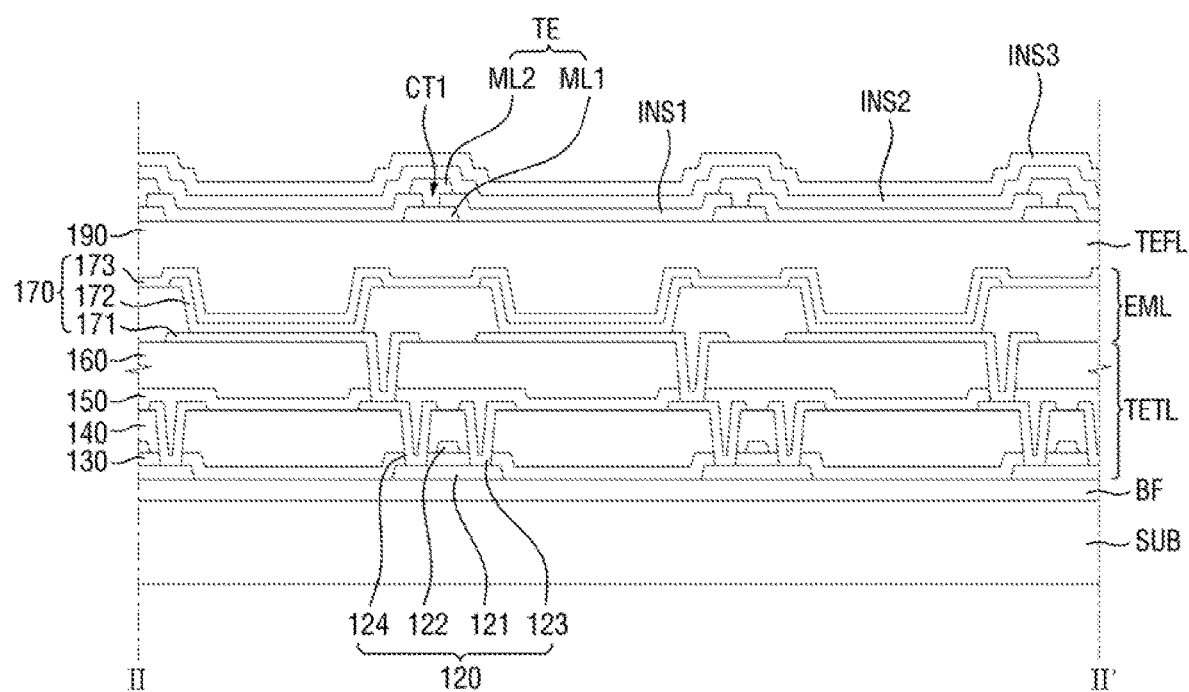
FIG. 9 is a cross-sectional view taken along line II-II' of FIG. 8.

FIG. 8 is an enlarged plan view illustrating an example of an area B of FIG. 7. FIG. 9 is a cross-sectional view taken along line II-II' of FIG. 8.

Referring to FIGS. 8 and 9, the TFT layer TFTL is formed on the substrate SUB. The TFT layer TFTL includes TFTs 120, a gate insulating film 130, an interlayer insulating film 140, a passivation film 150, and a planarization film 160.

A buffer film BF may be formed on the substrate SUB. The buffer film BF may protect the TFTs 120 and organic light-emitting layers 172 of the light-emitting element layer EML against moisture that may otherwise penetrate the TFTs 120 and the organic light-emitting layers 172 via the substrate SUB. The buffer film BF may include a plurality of inorganic films that are alternately stacked. For example, the buffer film BF may be formed as a multilayer film in which a silicon nitride layer, a silicon oxynitride layer, a silicon oxide layer, a titanium oxide layer, and/or an aluminum oxide layer are alternately stacked. The buffer film BF is optional and may be omitted.

The TFTs 120 are formed on the buffer film BF. The TFTs 120 include active layers 121, gate electrodes 122, source electrodes 123, and drain electrodes 124. FIG. 9 illustrates an example in which the TFTs 120 are top gate TFTs in which the gate electrodes 122 are disposed above the active layers 121, but the present disclosure is not limited thereto. For example, in an example, the TFTs 120 may be bottom gate TFTs in which the gate electrodes 122 are disposed below the active layers 121 or may be double gate TFTs in which the gate electrodes 122 are disposed above and below the active layers 121.

The active layers 121 are formed on the buffer film BF. The active layers 121 may include polycrystalline silicon, monocrystalline silicon, low-temperature polycrystalline silicon, amorphous silicon, or an oxide semiconductor. For example, the oxide semiconductor may include a binary compound (ABx), a ternary compound (ABxCy), or a quaternary compound (ABxCyDz) comprising indium (In), zinc (Zn), gallium (Ga), tin (Sn), titanium (Ti), aluminum (Al), hafnium (Hf), zirconium (Zr), and/or magnesium (Mg). For example, the active layer 121 may include indium tin zinc oxide (ITZO) or indium gallium zinc oxide (IGZO). A light-shielding layer for blocking external light incident upon the active layers 121 may be formed between the buffer film BF and the active layers 121.

The gate insulating film 130 may be formed on the active layers 121. The gate insulating film 130 may be formed as an inorganic film, for example, a silicon nitride layer, a silicon oxynitride layer, a silicon oxide layer, a titanium oxide layer, or an aluminum oxide layer.

The gate electrodes 122 and gate lines may be formed on the gate insulating film 130. The gate electrodes 122 and the gate lines may be formed as single- or multilayer films including molybdenum (Mo), Al, chromium (Cr), gold (Au), Ti, nickel (Ni), neodymium (Nd), and/or copper (Cu).

The interlayer insulating film 140 may be formed on the gate electrodes 122 and the gate lines. The interlayer insulating film 140 may be formed as an inorganic film, for example, a silicon nitride layer, a silicon oxynitride layer, a silicon oxide layer, a titanium oxide layer, and/or an aluminum oxide layer.

The source electrodes 123 and the drain electrodes 124 may be formed on the interlayer insulating film 140. The source electrodes 123 and the drain electrodes 124 may be connected to the active layers 121 via contact holes that penetrate the gate insulating film 130 and the interlayer insulating film 140. The source electrodes 123 and the drain electrodes 124 may be formed as single- or multilayer films including Mo, Al, Cr, Au, Ti, Ni, Nd, and/or Cu.

The passivation film 150 may be formed on the source electrodes 123 and the drain electrodes 124 to insulate the TFTs 120. The passivation film 150 may be formed as an inorganic film, for example, a silicon nitride layer, a silicon oxynitride layer, a silicon oxide layer, a titanium oxide layer, and/or an aluminum oxide layer.

The planarization film 160 may be formed on the passivation film 150 to planarize height differences formed by the TFTs 120. The planarization film 160 may be formed as an organic film including an acrylic resin, an epoxy resin, a phenolic resin, a polyamide resin, and/or a PI resin.

The light-emitting element layer EML is formed on the TFT layer TFTL. The light-emitting element layer EML includes light-emitting elements 170 and a pixel defining film 180.

The light-emitting elements 170 and the pixel defining film 180 are formed on the planarization film 160. The light-emitting elements 170 may include a first electrodes 171, organic light-emitting layers 172, and a second electrode 173.

The first electrode 171 may be formed on the planarization film 160. The first electrodes 171 may be connected to the source electrodes 123 of the TFTs 120 via contact holes that penetrate the passivation film 150 and the planarization film 160.

Where the light-emitting elements 170 have a top emission structure and emit light in a direction from the organic light-emitting layers 172 to the second electrode 173, the first electrodes 171 may include a metal material with high reflectance such as a stack of Al and Ti (e.g., Ti/Al/Ti), a stack of Al and ITO (e.g., ITO/Al/ITO), a silver (Ag)-palladium (Pd)-copper (Cu) (APC) alloy, or a stack of an APC alloy and ITO (e.g., ITO/APC/ITO).

Where the light-emitting elements 170 have a bottom emission structure and emit light in a direction from the organic light-emitting layers 172 to the first electrodes 171, the first electrodes 171 may include a transparent metal material capable of transmitting light therethrough, such as ITO or IZO, or a semitransparent metal material such as the alloy of Mg and Ag. When the first electrodes 171 are formed of a semitransparent metal material, the emission efficiency of the light-emitting elements 170 may be increased due to micro-cavities.

The pixel defining film 180 may define the first electrodes 171 on a planarization film 250 and thus to define sub-pixels (R, G, and B). The pixel defining film 180 may cover the edges of each of the first electrodes 171. The pixel defining film 180 may be an organic film including an acrylic resin, an epoxy resin, a phenolic resin, a polyamide resin, and/or a PI resin.

The sub-pixels (R, G, and B) are regions in which the first electrodes 171, the organic light-emitting layers 172, and the second electrode 173 are sequentially stacked so that holes from the first electrons 171 and electrons from the second electrode 173 can combine in the organic light-emitting layers 172 and can thus emit light.

Referring to FIG. 8, one red sub-pixel R, one blue sub-pixel B, and two green sub-pixels G may together form a single pixel P. Blue sub-pixels B may have a larger area than red sub-pixels R, and red sub-pixels R may have a larger area than green sub-pixels G. FIG. 8 illustrates an example in which the red sub-pixels R, the green sub-pixels G, and the blue sub-pixels B each have an octagonal shape in a plan view, but the present disclosure is not limited thereto. In an example, the red sub-pixels R, the green sub-pixels G, and the blue sub-pixels B may each have a polygonal shape other than an octagonal shape, a circular shape, or an elliptical shape in a plan view.

The organic light-emitting layers 172 are formed on the first electrodes 171 and on the pixel defining film 180. The organic light-emitting layers 172 may include an organic material and may thus emit light of a predetermined color. For example, each of the organic light-emitting layers 172 may include a hole transport layer, an organic material layer, and an electron transport layer. In this example, the organic light-emitting layers 172 of the red sub-pixels R may emit red light, the organic light-emitting layers 172 of the green sub-pixels G may emit green light, and the organic light-emitting layers 172 of the blue sub-pixels B may emit blue light. In an example, the organic light-emitting layers 172 of the sub-pixels (R, G, and B) may emit white light. In this example, the red sub-pixels R may further include red color filter layers, the green sub-pixels G may further include green color filter layers, and the blue sub-pixels B may further include blue color filter layers.

The second electrode 173 is formed on the organic light-emitting layers 172. The second electrode 173 may cover the organic light-emitting layers 172. The second electrode 173 may be a common layer formed in common for all the pixels P. A capping layer may be formed on the second electrode 173.

Where the light-emitting elements 170 have a top emission structure, the second electrode 173 may include a transparent metal material capable of transmitting light therethrough, such as ITO or IZO, or a semitransparent metal material such as the alloy of Mg and Ag. When the second electrode 173 is formed of a semitransparent metal material, the emission efficiency of the light-emitting elements 170 may be increased due to micro-cavities.

Where the light-emitting elements 170 have a bottom emission structure, the second electrode 173 may include a metal material with high reflectance such as a stack of Al and Ti (e.g., Ti/Al/Ti), a stack of Al and ITO (e.g., ITO/Al/ITO), an APC alloy, or a stack of an APC alloy and ITO (e.g., ITO/APC/ITO).

The thin-film encapsulation layer TFEL is formed on the light-emitting element layer EML. The thin-film encapsulation layer TFEL includes an encapsulation film 190.

The encapsulation film 190 is disposed on the second electrode 173. The encapsulation film 190 may include at least one inorganic film to prevent the infiltration of oxygen or moisture into the organic light-emitting layers 172 and the second electrode 173. Also, the encapsulation film 190 may include at least one organic film to protect the light-emitting element layer EML against foreign materials such as dust. For example, the encapsulation film 190 may include a first inorganic film disposed on the second electrode 173, an organic film disposed on the first inorganic film, and a second inorganic film disposed on the organic film. The first and second inorganic films may include silicon nitride layers, silicon oxynitride layers, silicon oxide layers, titanium oxide layers, or aluminum oxide layers, but the present disclosure is not limited thereto. The organic film may include an acrylic resin, an epoxy resin, a phenolic resin, a polyamide resin, or a PI resin.

The touch sensor layer TSL is formed on the thin-film encapsulation layer TFEL. The touch sensor layer TSL includes the driving electrodes TE, the sensing electrodes RE, connecting electrodes BE, the first driving wires TL1, the second driving lines TL2, the sensing lines RL, the guard lines (GL1, GL2, GL3, GL4, and GL5), and the ground lines (GRL1, GRL2, and GRL3). For the convenience of description, FIGS. 8 and 9 illustrate only the driving electrodes TE of the touch sensor layer TSL. However, it is to be understood that various other elements may be present, as would be understood by one of ordinary skill in the art.

The driving electrodes TE are formed on the encapsulation film 190. The sensing lines RE, the first driving lines TL1, the second driving lines TL2, the sensing lines RL, the guard lines (GL1, GL2, GL3, GL4, and GL5), and the ground lines (GRL1, GRL2, and GRL3) may also be disposed on the encapsulation film 190. For example, the driving electrodes TE, the sensing electrodes RE, the first driving lines TL1, the second driving lines TL2, the sensing lines RL, the guard lines (GL1, GL2, GL3, GL4, and GL5), and the ground lines (GL1, GL2, and GL3) may be disposed in the same layer and may include the same material.

The driving electrodes TE may include first metal layers ML1 and second metal layers ML2. The first metal layers ML1 are formed on the encapsulation film 190. The first metal layers ML1 at least partially overlap with the pixel defining film 180, but do not overlap with the red sub-pixels R, the green sub-pixels G, or the blue sub-pixels B. For example, the first metal layers ML1 may include a stack of Al and Ti (e.g., Ti/Al/Ti), a stack of Al and ITO (e.g., ITO/Al/ITO), an APC alloy, or a stack of an APC alloy and ITO (e.g., ITO/APC/ITO), but the present disclosure is not limited thereto.

A first insulating film INS1 is formed on the first metal layers ML1. First contact holes CT1, which expose the first metal layers ML1, may be formed through the first insulating film INS1.

The second metal layers ML2 are formed on the first insulating film INS1. The second metal layers ML2 at least partially overlap with the pixel defining film 180, but do not overlap with the red sub-pixels R, the green sub-pixels G, or the blue sub-pixels B. The second metal layers ML2 may be connected to the first metal layers ML1 via the first contact holes CT1. The second metal layers ML2 may include the same material as the first metal layers ML1. For example, the second metal layers ML2 may include a stack of Al and Ti (e.g., Ti/Al/Ti), a stack of Al and ITO (e.g., ITO/Al/ITO), an APC alloy, or a stack of an APC alloy and ITO (e.g., ITO/APC/ITO), but the present disclosure is not limited thereto.

A second insulating film INS2 is formed on the second metal layers ML2. Second contact holes CT2, which expose the second metal layers ML2, may be formed through the second insulating film INS2.

The connecting electrodes BE are formed on the second insulating film INS2. The connecting electrodes BE at least partially overlap with the pixel defining film 180, but do not overlap with the red sub-pixels R, the green sub-pixels G, or the blue sub-pixels B. The connecting electrodes BE may be connected to the second metal layer ML2 via the second contact holes CT2. The connecting electrodes BE, like the driving electrodes TE, may each include a plurality of metal layers or may include a single metal layer. The metal layer(s) of each of the connecting electrodes BE may include a stack of Al and Ti (e.g., Ti/Al/Ti), a stack of Al and ITO (e.g., ITO/Al/ITO), an APC alloy, or a stack of an APC alloy and ITO (e.g., ITO/APC/ITO), but the present disclosure is not limited thereto. FIG. 9 illustrates an example in which each of the connecting electrodes BE includes a single metal layer.

A third insulating film INS3 is formed on the connecting electrodes BE. The first, second, and third insulating films INS1, INS2, and INS3 may be formed as inorganic films, for example, silicon nitride layers, silicon oxynitride layers, silicon oxide layers, titanium oxide layers, or aluminum oxide layers.

According to the exemplary embodiment of FIGS. 8 and 9, since the touch electrodes (TE and RE) are formed directly on the encapsulation film 190, the thickness of the display device 10 can be reduced as compared to when a separate touch panel including the touch electrodes (TE and RE) is attached on the encapsulation film 190.

Also, according to the exemplary embodiment of FIGS. 8 and 9, since the touch electrodes (TE and RE) are formed as mesh-type electrodes and at least partially overlap with the pixel defining film 180, the aperture area of the sub-pixels (R, G, and B) can be prevented from decreasing. Also, the parasitic capacitance between the touch electrodes (TE and RE) and the second electrode 173 can be reduced.

Also, according to the exemplary embodiment of FIGS. 8 and 9, since the touch electrodes (TE and RE) include the first metal layers ML1 and the second metal layers ML2, the thickness of the touch electrodes (TE and RE) can be reduced. Accordingly, the resistance of the touch electrodes (TE and RE) can be lowered. Therefore, since the speed of charging mutual capacitance using the driving signal can be increased without the need to lower the frequency of the driving signal, touch sensitivity can be increased.

Figure 10:
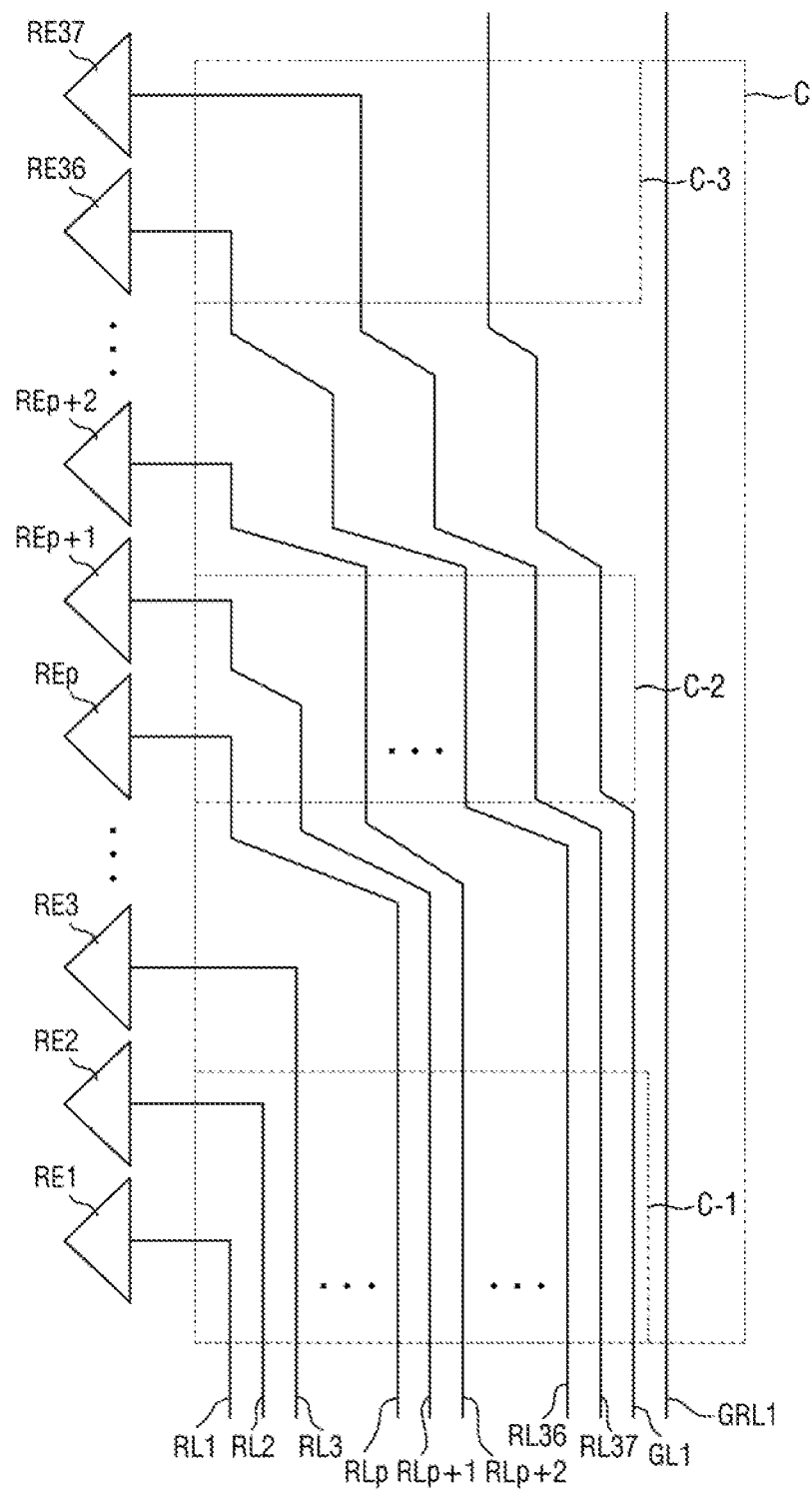
FIG. 10 is an enlarged plan view illustrating an example of an area C of FIG. 6.
Figure 11:
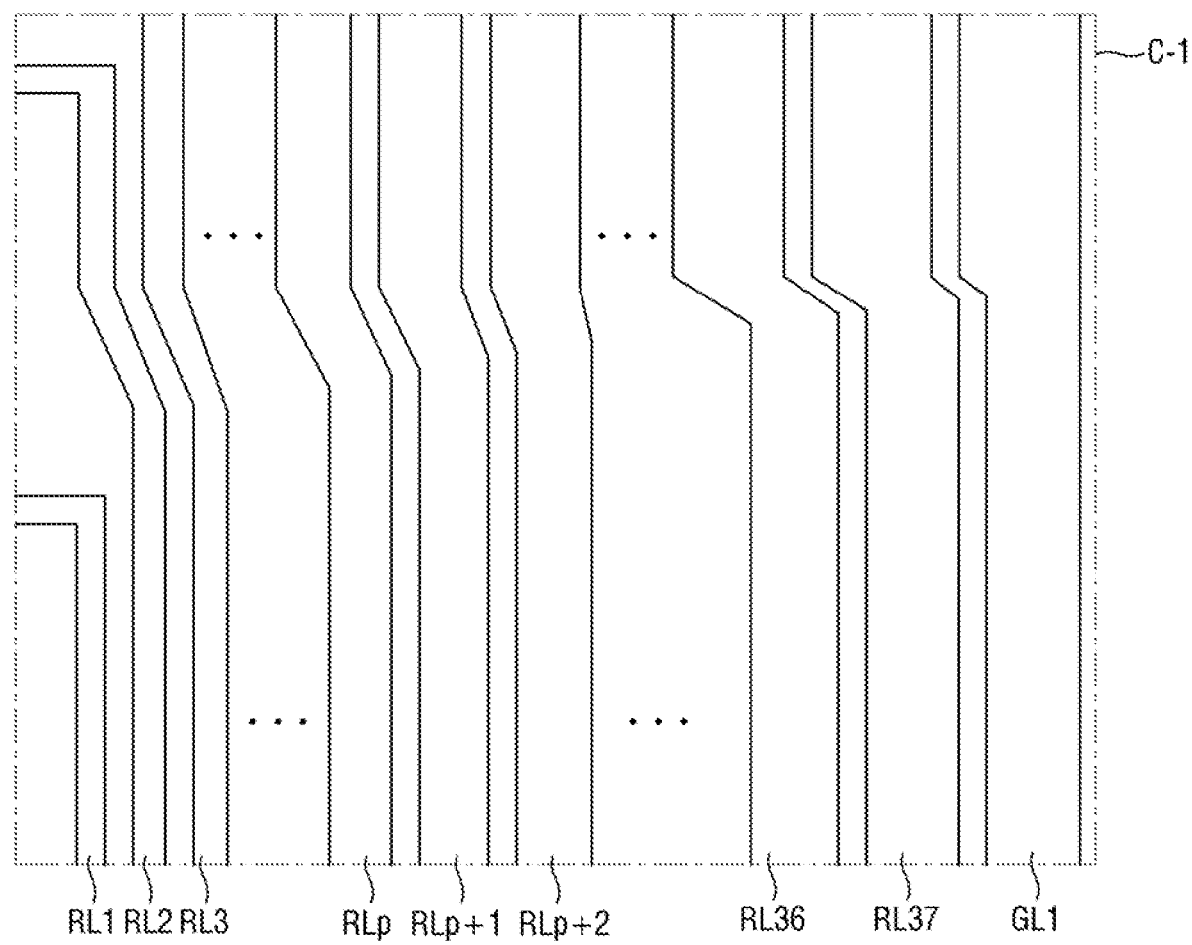
FIG. 11 is an enlarged plan view illustrating an example of an area C-1 of FIG. 10.
Figure 12:
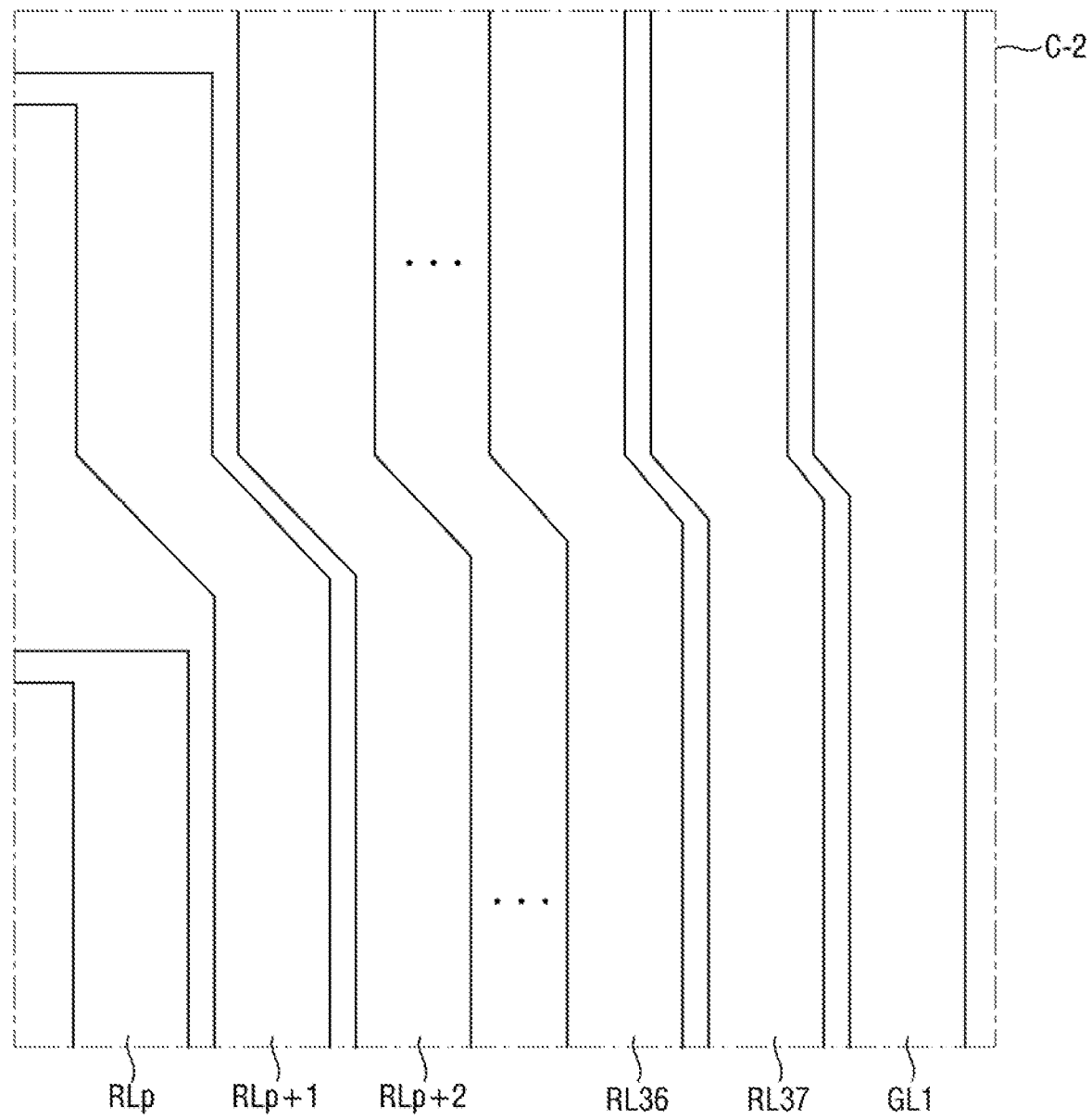
FIG. 12 is an enlarged plan view of illustrating example of an area C-2 of FIG. 10.
Figure 13:
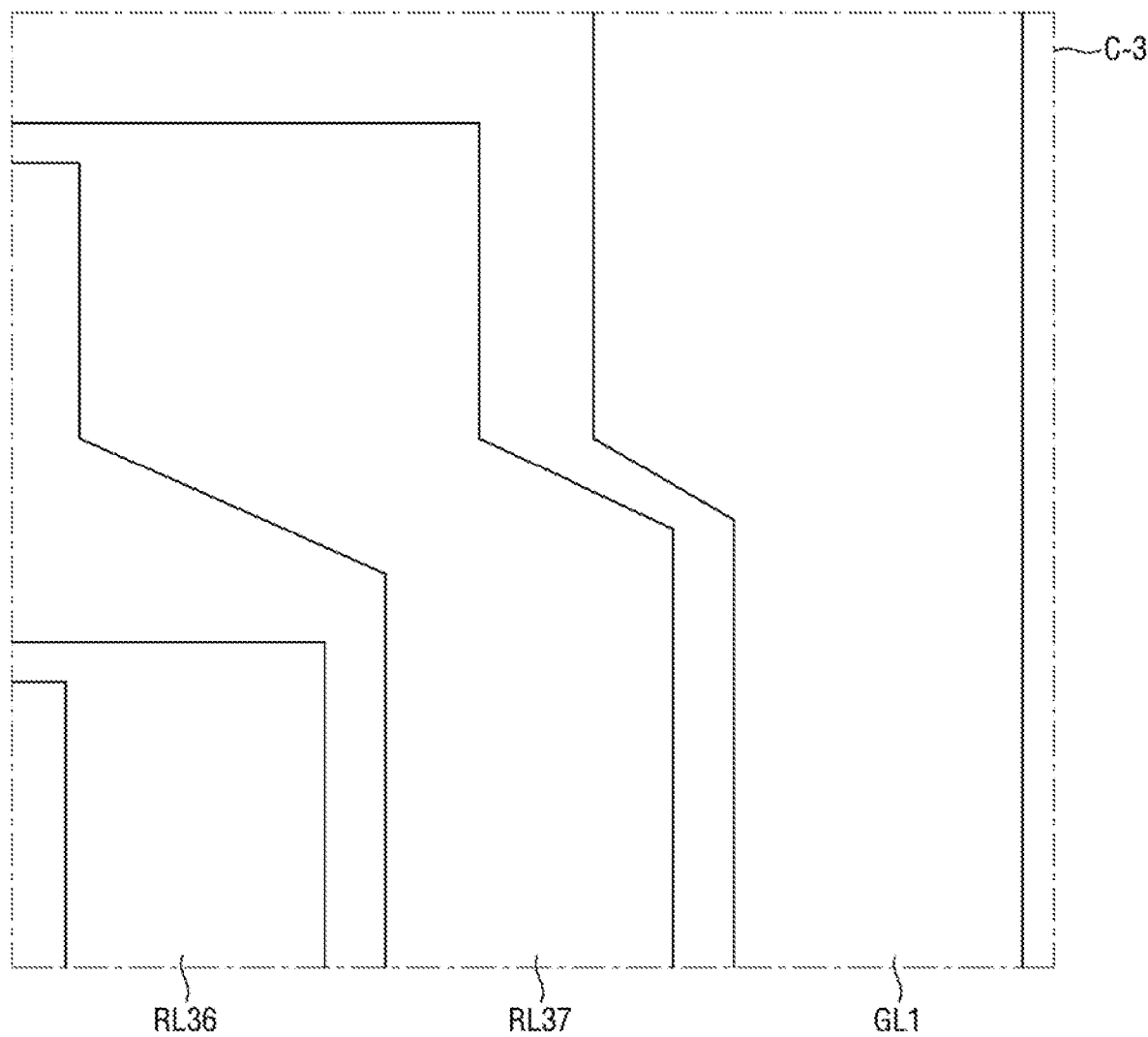
FIG. 13 is an enlarged plan view illustrating an example of an area C-3 of FIG. 10.

FIG. 10 is an enlarged plan view illustrating an example of an area C of FIG. 6. FIG. 11 is an enlarged plan view of an example of an area C-1 of FIG. 10. FIG. 12 is an enlarged plan view of an example of an area C-2 of FIG. 10. FIG. 13 is an enlarged plan view of an example of an area C-3 of FIG. 10. For example, FIGS. 10 through 13 illustrate the first through third, p-th through (p+2)-th, thirty sixth, and thirty seventh sensing lines RL1 through RL3, RLp through RLp+2 (where p is an integer satisfying $4 \leq p \leq 33$), RL36, and RL37, the first guard line GL1, and the first ground line GRL1 in a part of the touch peripheral area TPA on the right side of the touch sensor area TSA. For the convenience of description, only the sensing electrodes RE at the right ends of the first through thirty seventh rows of sensing electrodes RE1 through RE37 are illustrated in FIG. 10. However, it is to be understood that various other elements may be present, as would be understood by one of ordinary skill in the art.

Referring to FIGS. 10 through 13, the first sensing line RL1 may be connected to the first row of sensing electrodes RE1, the second sensing line RL2 may be connected to the second row of sensing electrodes RE2, and the third sensing line RL3 may be connected to the third row of sensing electrodes RE3. For example, the first sensing line RL1 may be connected to the sensing electrode RE at the right end of the first row of sensing electrodes RE1, the second sensing line RL2 may be connected to the sensing electrode RE at the right end of the second row of sensing electrodes RE2, and the third sensing line RL3 may be connected to the sensing electrode RE at the right end of the third row of sensing electrodes RE3.

The p-th sensing line RLp may be connected to a p-th row of sensing electrodes REp, the (p+1)-th sensing line RLp+1 may be connected to a (p+1)-th row of sensing electrodes REp+1, and the (p+2)-th sensing line RLp+2 may be connected to a (p+2)-th row of sensing electrodes REp+2. For example, the p-th sensing line RLp may be connected to the sensing electrode RE at the right end of the p-th row of sensing electrodes REp, the (p+1)-th sensing line RLp+1 may be connected to the sensing electrode RE at the right end of the (p+1)-th row of sensing electrodes REp+1, and the (p+2)-th sensing line RLp+2 may be connected to the sensing electrode RE at the right end of the (p+2)-th row of sensing electrodes REp+2.

The thirty sixth sensing line RL36 may be connected to the thirty sixth row of sensing electrodes RE36, and the thirty seventh sensing line RL37 may be connected to the thirty seventh row of sensing electrodes RE37. For example, the thirty sixth sensing line RL36 may be connected to the sensing electrode RE at the right end of the thirty sixth sensing line RL36 row of sensing electrodes RE36, and the thirty seventh sensing line RL37 may be connected to the sensing electrode RE at the right end of the thirty seventh row of sensing electrodes RE37.

Since the first row of sensing electrodes RE) are disposed below the touch sensor area TSA, the first row of sensing electrodes RE1 are closest to the first touch pads TP1, and since the thirty seventh row of sensing electrodes RE37 are disposed above the touch sensor area TSA, the thirty seventh row of sensing electrodes RE37 are farthest from the first touch pads TP1. For example, since the distance to the first touch pads TP1 increases from the first row of sensing electrodes RE1 to the thirty seventh row of sensing electrodes RE37, the length of the sensing lines RL increases from the first sensing line RL1 to the thirty seventh sensing line RL37, and as a result, the difference in wiring resistance between the first and thirty seventh sensing lines RL1 and RL37 increases. In this case, not only the speed at which the mutual capacitance of the touch electrodes (TE and RE) is charged by the driving signal, but also a charge variation in the mutual capacitance of the touch electrodes (TE and RE), may vary. For example, the touch sensitivity of the first row of sensing electrodes RE1 to which the first sensing line RL1 is connected may differ from the touch sensitivity of the thirty seventh row of sensing electrodes RE37 to which the thirty seventh sensing line RL37 is connected. As the difference between the touch sensitivity of the first row of sensing electrodes RE1 and the touch sensitivity of the thirty seventh row of sensing electrodes RE37 increases, it may become more difficult to calculate touch coordinates with precision. To address this problem, the touch lines (TL and RL) of the touch peripheral area TPA may be designed in a differential line width expansion manner and in an identical line width expansion manner.

In a first region of the touch peripheral area TPA, the first through third, p-th through (p+2)-th, thirty sixth, and thirty seventh sensing lines RL1 through RL3, RLp through RLp+2, RL36, and RL37 may be designed in the differential line width expansion manner. For example, the first through third, p-th through (p+2)-th, thirty sixth, and thirty seventh sensing lines RL1 through RL3, RLp through RLp+2, RL36, and RL37 may be designed to have different widths from one another in the first region of the touch peripheral area TPA. The first through third, p-th through (p+2)-th, thirty sixth, and thirty seventh sensing lines RL1 through RL3, RLp through RLp+2, RL36, and RL37 may be designed to have their width expanded in accordance with a decrease in the number of sensing lines RL. Accordingly, in the first region of the touch peripheral area TPA, the width of the first through third, p-th through (p+2)-th, thirty sixth, and thirty seventh sensing lines RL1 through RL3, RLp through RLp+2, RL36, and RL37 may vary in a direction of the length of the first through third, p-th through (p+2)-th, thirty sixth, and thirty seventh sensing lines RL1 through RL3, RLp through RLp+2, RL36, and RL37. Referring to FIG. 10, the first region may be the area C-1, a second region of the touch peripheral area TPA may be the area C-3, and a third region of the touch peripheral area TPA may be the area C-2.

For example, referring to FIG. 11, in the area C-1, the longer the sensing lines RL, the wider the sensing lines RL. Accordingly, in a first row, the first sensing line RL1 may have a smallest width, and the thirty seventy sensing line RL37 may have a greatest width. In the first row, the width of the sensing lines RL may gradually increase from that of the first sensing line RL1, which is the innermost sensing line RL among sensing lines RL in the first row, to that of the thirty seventh sensing line RL37, which is the outermost sensing line RL among the sensing lines RL in the first row. In a second row, the second sensing line RL2 may have a smallest width, and the thirty seventh sensing line RL37 may have a greatest width. In the second row, the width of the sensing lines RL may gradually increase from that of the second sensing line RL2 to that of the thirty seventh sensing line RL37. Here, the first row refers to a row in which the first sensing line RL1 is connected to the first row of sensing electrodes RE1, and the second row refers to a row in which the second sensing line RL2 is connected to the second row of sensing electrodes RE2.

Since the first sensing line RL1 is disposed in the first row, but not in the second row, the number of sensing lines RL disposed in the second row may be smaller than the number of sensing lines RL disposed in the first row. Accordingly, the second, (p+1)-th, (p+2)-th, thirty sixth, and thirty seventh sensing lines RL2, RLp+1, RLp+2, RL36, and RL37 in the second row may have a greater width than the first, second, (p+1)-th, (p+2)-th, thirty sixth, and thirty seventh sensing lines RL1, RL2, RLp+1, RLp+2, RL36, and RL37 in the first row.

In the second and third regions of the touch peripheral area TPA, the p-th through (p+2)-th, thirty sixth, and thirty seventh sensing lines RLp through RLp+2, RL36, and RL37 may be designed in the identical line width expansion manner. For example, in the second and third regions, the p-th through (p+2)-th, thirty sixth, and thirty seventh sensing lines RLp through RLp+2, RL36, and RL37 may be designed to have the same width. Also, as the number of sensing lines RL decreases away from the first touch pads TP1, the first through third, p-th through (p+2)-th, thirty sixth, and thirty seventh sensing lines RL1 through RL3, RLp through RLp+2, RL36, and RL37 may be designed to have their width expanded in accordance with a decrease in the number of sensing lines RL. Accordingly, in the second and third regions, the width of the first through third, p-th through (p+2)-th, thirty sixth, and thirty seventh sensing lines RL1 through RL3, RLp through RLp+2, RL36, and RL37 may vary in the direction of the length of the first through third, p-th through (p+2)-th, thirty sixth, and thirty seventh sensing lines RL1 through RL, RLp through RLp+2, RL36, and RL37. The second and third sensing regions may be farther than the first region from the first touch pads TP1, and the second region may be farther than the third region from the first touch pads TP1.

For example, referring to the area C-2 of FIG. 12, in a p-th row, the p-th, (p+1)-th, (p+2)-th, thirty sixth, and thirty seventh sensing lines RLp, RLp+1, RLp+2, RL36, and RL37 may have the same width. Also, in a (p+1)-th row, the (p+1)-th, (p+2)-th, thirty sixth, and thirty seventh sensing lines RLp+1, RLp+2, RL36, and RL37 may have the same width. Also, in a (p+2)-th row, the (p+2)-th, thirty sixth, and thirty seventh sensing lines RLp+2, RL36, and RL37 may have the same width. Also, in a thirty sixth row, the thirty sixth and thirty seventh sensing lines RL36 and RL37 may have the same width. Here, the p-th row refers to a row in which the p-th sensing line RLp is connected to the p-th row of sensing electrodes REp, the (p+1)-th row refers to a row in which the (p+1)-th sensing line RLp+1 is connected to the (p+1)-th row of sensing electrodes REp+1, the (p+2)-th row refers to a row in which the (p+2)-th sensing line RLp+2 is connected to the (p+2)-th row of sensing electrodes REp+2, the thirty sixth row refers to a row in which the thirty sixth sensing line RL36 is connected to the thirty sixth row of sensing electrodes RE36, and the thirty seventh row refers to a row in which the thirty seventh sensing line RL37 is connected to the thirty seventh row of sensing electrodes RE37.

In the area C-2, since the p-th sensing line RLp is disposed in the p-th row, but not in the (p+1)-th row, the number of sensing lines RL disposed in the (p+1)-th row may be smaller than the number of sensing lines RL disposed in the p-th row. Accordingly, the (p+1)-th, (p+2)-th, thirty sixth, and thirty seventh sensing lines RLp+1, RLp+2, RL36, and RL37 in the (p+1)-th row may have a greater width than the p-th, (p+1)-th, (p+2)-th, thirty sixth, and thirty seventh sensing lines RLp, RLp+1, RLp+2, RL36, and RL37 in the p-th row.

Also, in the area C-2, since the (p+1)-th sensing line RLp+1 is disposed in the (p+1)-th row, but not in the (p+2)-th row, the number of sensing lines RL disposed in the (p+2)-th row may be smaller than the number of sensing lines RL disposed in the (p+1)-th row. Accordingly, the (p+2)-th, thirty sixth, and thirty seventh sensing lines RLp+2, RL36, and RL37 in the (p+2)-th row may have a greater width than the (p+1)-th, (p+2)-th, thirty sixth, and thirty seventh sensing lines RLp+1, RLp+2, RL36, and RL37 in the (p+1)-th row.

Also, in the area C-2, since the thirty sixth sensing line RL36 is disposed in the thirty sixth row, but not in the thirty seventh row, the number of sensing lines RL disposed in the thirty seventh row may be smaller than the number of sensing lines RL disposed in the thirty sixth row. Accordingly, the thirty seventh sensing line RL37 in the thirty seventh row may have a greater width than the thirty sixth and thirty seventh sensing lines RL36 and RL37 in the thirty sixth row.

Also, the width of the first guard line GL1 may be substantially the same as the width of the thirty seventh sensing line RL37, which is the outermost sensing line RL among the first through third, p-th through (p+2)-th, thirty sixth, and thirty seventh sensing lines RL1 through RL3, RLp through RLp+2, RL36, and RL37. Also, the width of the first ground line GRL1 may be uniform in the area C, and in the area C-3, the width of the thirty seventh sensing line RL37, which is the outermost sensing line RL among the first through third sensing lines RL1 through RL3, and the width of the first guard line GL1 may be greater than the width of the first ground line GRL1.

Where in the first region, the first through third, p-th through (p+2)-th, thirty sixth, and thirty seventh sensing lines RL1 through RL3, RLp through RLp+2, RL36, and RL37 are designed in the differential line width expansion manner and in the second and third regions, the p-th through (p+2)-th, thirty sixth, and thirty seventh sensing lines RLp through RLp+2, RL36, and RL37 are designed in the identical line width expansion manner, as illustrated in FIGS. 10 through 13, the line width of the first through third, p-th through (p+2)-th, thirty sixth, and thirty seventh sensing lines RL1 through RL3, RLp through RLp+2, RL36, and RL37 can be increased in proportion to the length of the first through third, p-th through (p+2)-th, thirty sixth, and thirty seventh sensing lines RL1 through RL3, RLp through RLp+2, RL36, and RL37. Thus, referring to FIG. 14, the resistance of the first through third, p-th through (p+2)-th, thirty sixth, and thirty seventh sensing lines RL through RU, RLp through RLp+2, RL36, and RL37 can be made uniform as compared to a case where the first through third, p-th through (p+2)-th, thirty sixth, and thirty seventh sensing lines RL1 through RL3, RLp through RLp+2, RL36, and RL37 are designed in the identical line width expansion manner in all the first, second, and third regions. Accordingly, differences in the speed at which the mutual capacitance of the touch electrodes (TE and RE) is charged by the driving signal can be reduced, and differences in mutual capacitance charge variations can be minimized. Therefore, the difference in touch sensitivity between the first row of sensing electrodes RE1 to which the first sensing line RL1 is connected and the thirty seventh row of sensing electrodes RE37 to which the thirty seventh sensing line RL37 is connected can be reduced.

As the area of the first region increases, the area of the sensing lines RL designed in the differential line width expansion manner increases. As a result, referring to FIG. 14, the resistance of the tenth through twentieth sensing lines RL10 through RL20 may become higher than the resistance of the twenty first through thirty seventh sensing lines RL21 through RL37. Accordingly, the area of the first region where the first through third, p-th through (p+2)-th, thirty sixth, and thirty seventh sensing lines RL1 through RL3, RLp through RLp+2, RL36, and RL37 are designed in the differential line width expansion manner may be set in consideration of the resistance of the first through third, p-th through (p+2)-th, thirty sixth, and thirty seventh sensing lines RL1 through RL3, RLp through RLp+2, RL36, and RL37.

Figure 15:
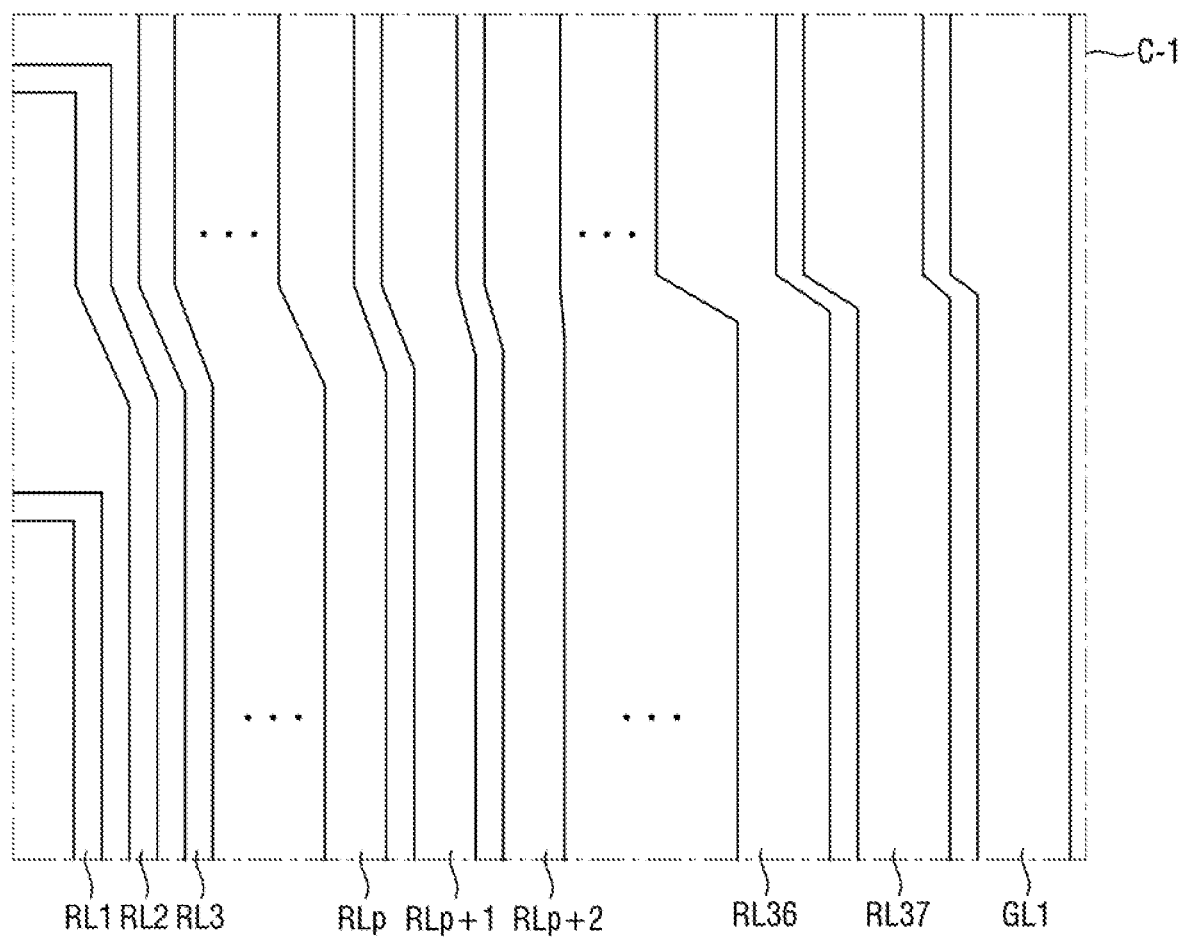
FIG. 15 is an enlarged plan view illustrating an example of the area C-1 of FIG. 10.

FIG. 15 is an enlarged plan view illustrating an example of the area C-1 of FIG. 10. For example, FIG. 15 illustrates an example of designing the sensing lines RL in the differential line width expansion manner.

Referring to FIG. 15, in the area C-1, the sensing lines RL may have different widths from one group to another group. For example, the first through third sensing lines RL1 through RL3 may have the same width, the p-th through (p+2)-th sensing lines RLp through RLp+2 may have the same width, and the thirty sixth and thirty seventh sensing lines RL36 and RL37 may have the same width. The first through third sensing lines RL1 through RL3 may have a smaller width than the p-th through (p+2)-th sensing lines RLp through RLp+2, and the p-th through (p+2)-th sensing lines RLp through RLp+2 may have a smaller width than the thirty sixth and thirty seventh sensing lines RL36 and RL37.

Where the first through third, p-th through (p+2)-th, thirty sixth, and thirty seventh sensing lines RL1 through RL3, RLp through RLp+2, RL36, and RL37 are designed in the differential line width expansion manner in the first region, as illustrated in FIG. 15, and the p-th through (p+2)-th, thirty sixth, and thirty seventh sensing lines RLp through RLp+2, RL36, and RL37 are designed in the identical line width expansion manner in the second and third regions, as illustrated in FIGS. 12 and 13, the line width of the first through third, p-th through (p+2)-th, thirty sixth, and thirty seventh sensing lines RL1 through RL3, RLp through RLp+2, RL36, and RL37 can be increased in proportion to the length of the first through third, p-th through (p+2)-th, thirty sixth, and thirty seventh sensing lines RL1 through RL3, RLp through RLp+2, RL36, and RL37. Thus, the resistance of the first through third, p-th through (p+2)-th, thirty sixth, and thirty seventh sensing lines RL1 through RL3, RLp through RLp+2, RL36, and RL37 can be made uniform as compared to a case where the first through third, p-th through (p+2)-th, thirty sixth, and thirty seventh sensing lines RL1 through RL3, RLp through RLp+2, RL36, and RL37 are designed in the identical line width expansion manner in all the first, second, and third regions.

Figure 16:
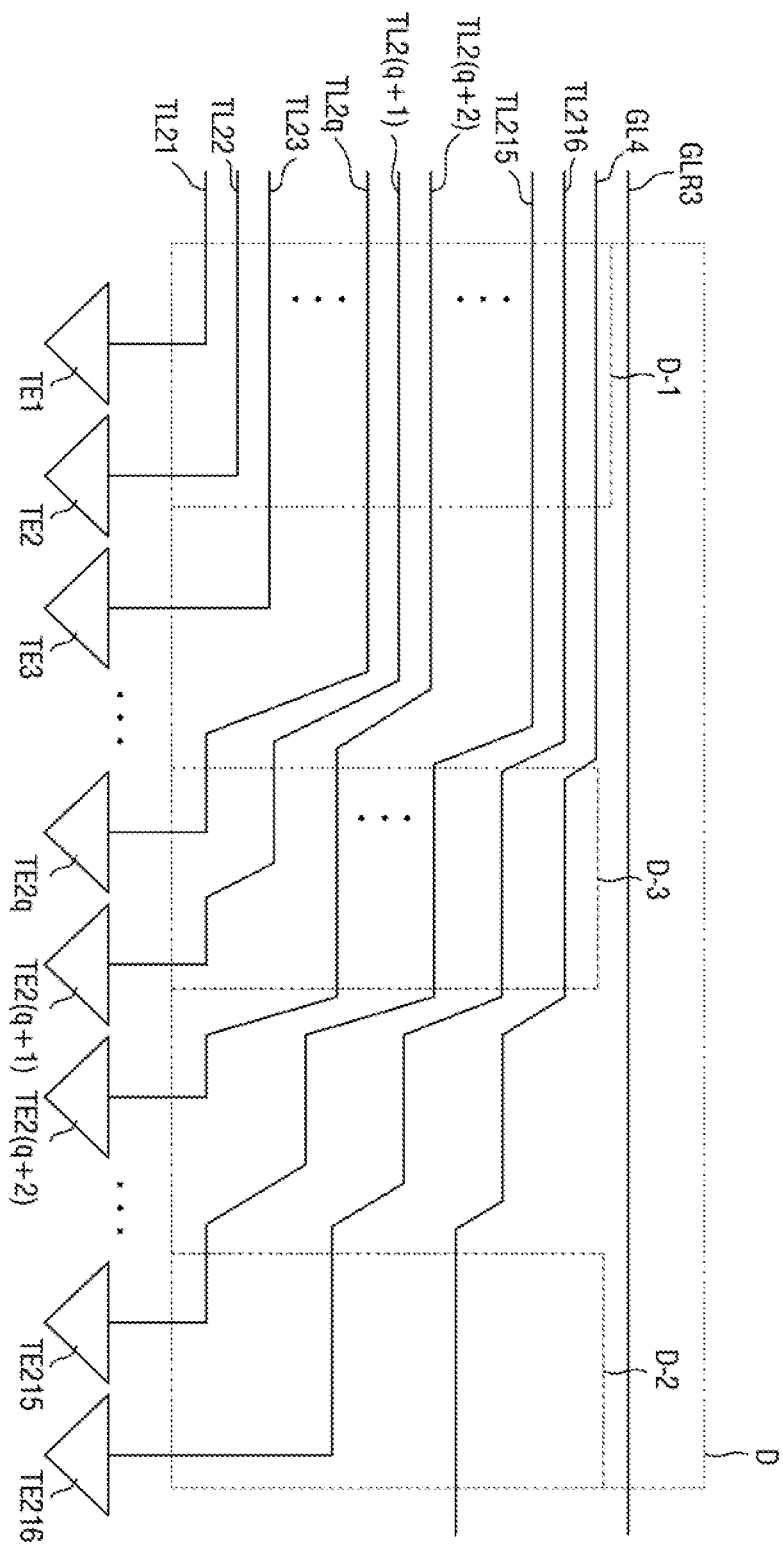
FIG. 16 is an enlarged plan view illustrating an example of an area D of FIG. 6.
Figure 17:
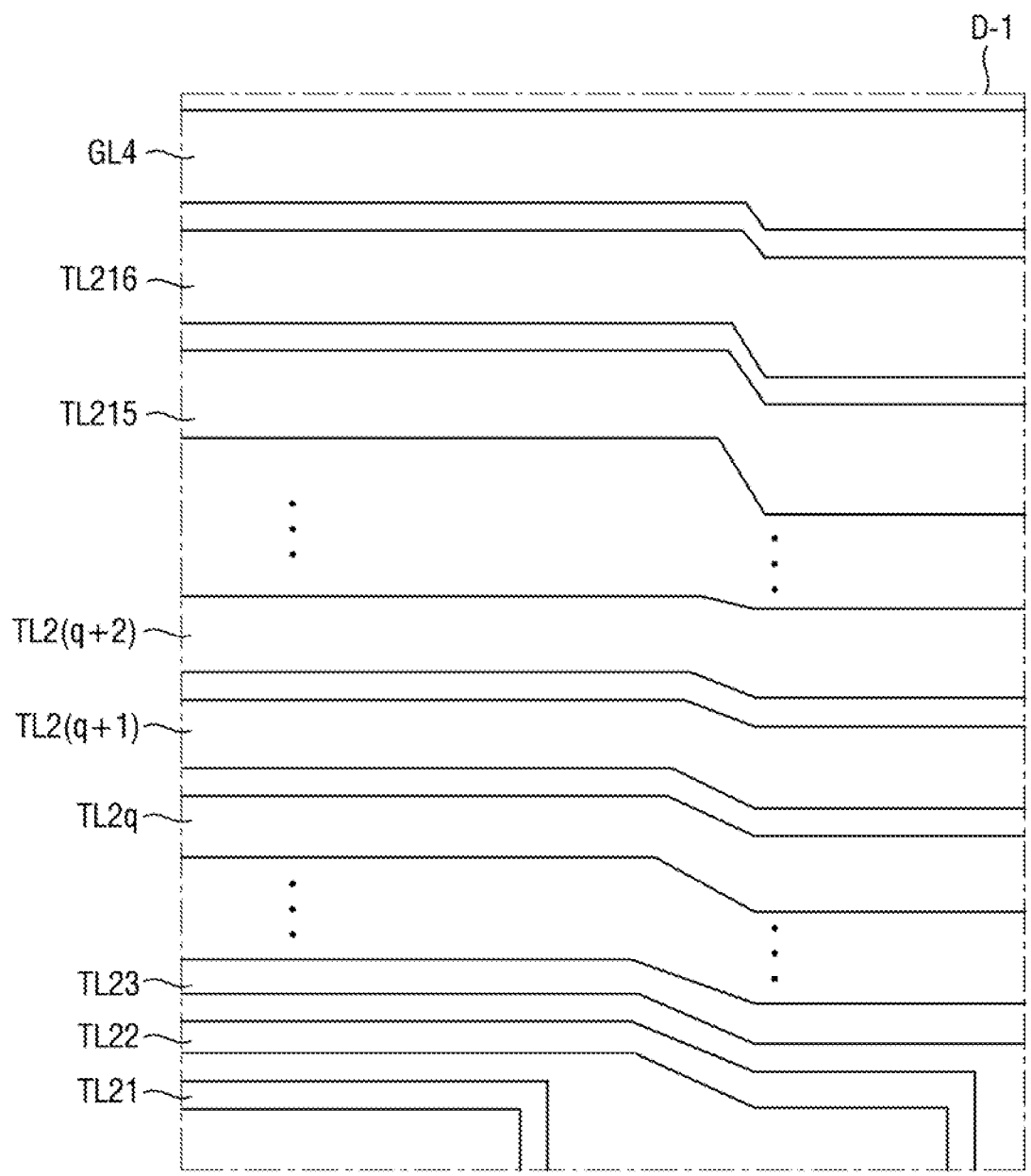
FIG. 17 is an enlarged plan view illustrating an example of an area D-1 of FIG. 16.
Figure 18:
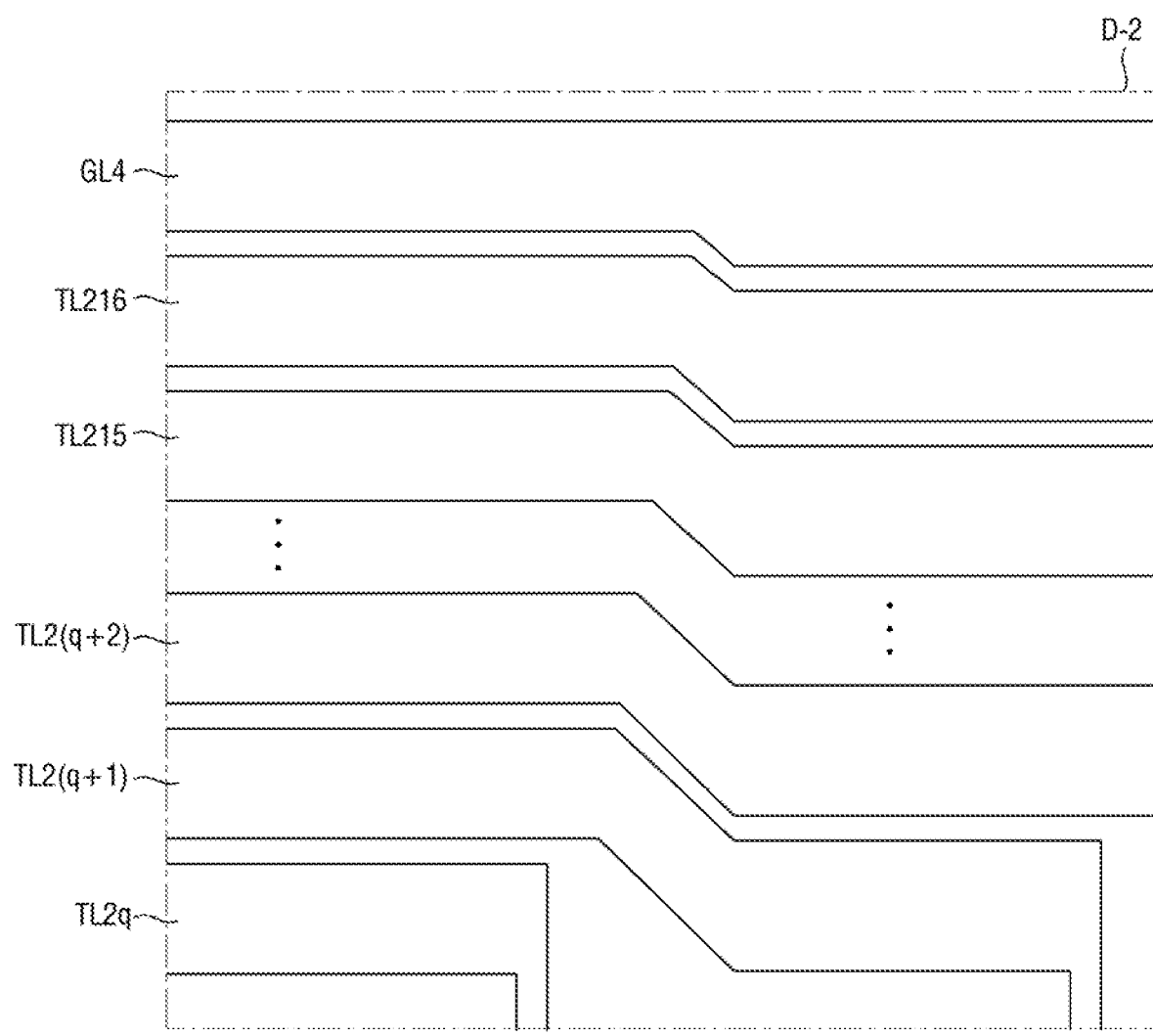
FIG. 18 is an enlarged plan view illustrating an example of an area D-2 of FIG. 16.
Figure 19:
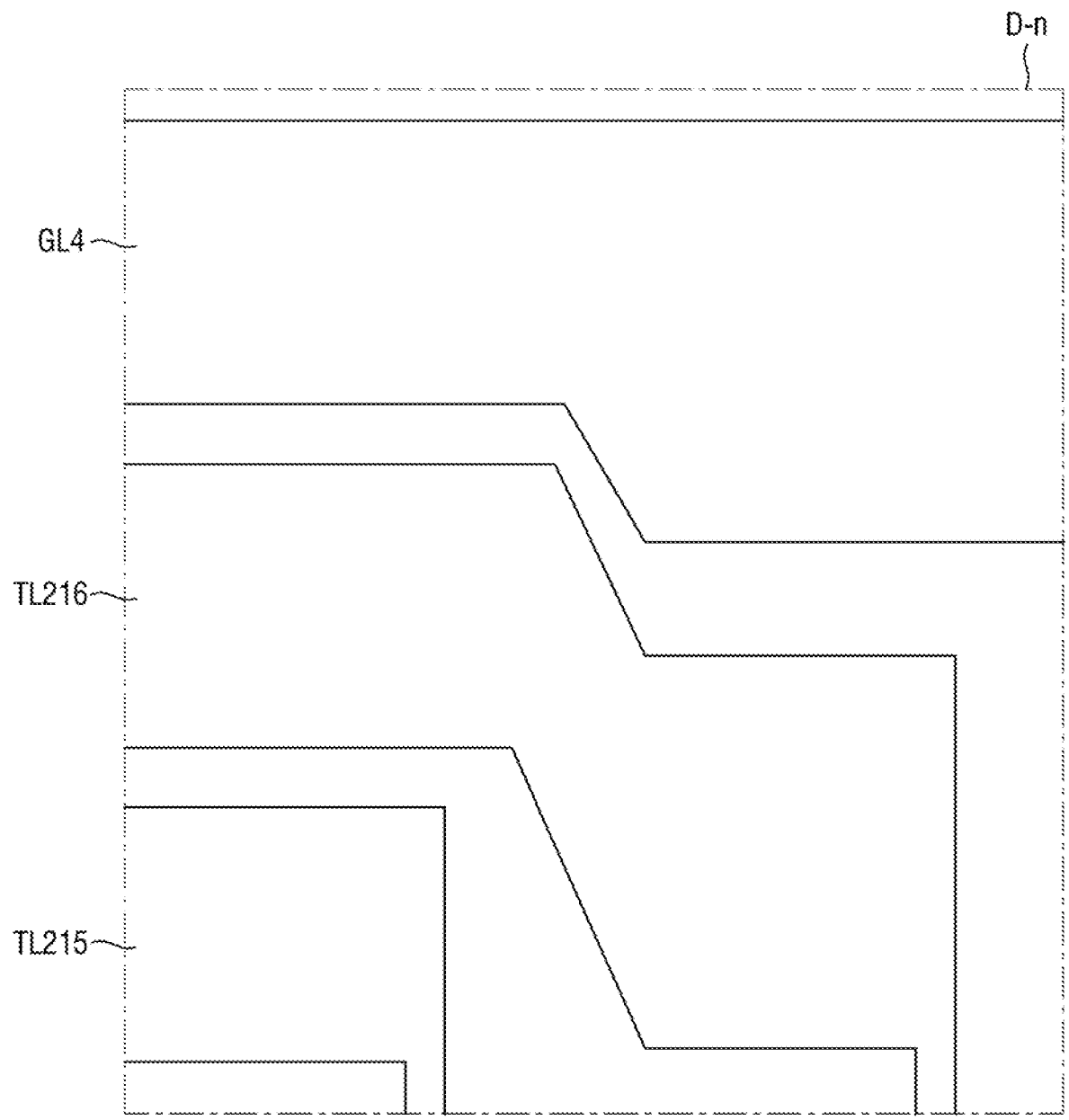
FIG. 19 is an enlarged plan view illustrating an example of an area D-3 of FIG. 16.

FIG. 16 is an enlarged plan view illustrating an example of an area D of FIG. 6. FIG. 17 is an enlarged plan view illustrating an example of an area D-1 of FIG. 16. FIG. 18 is an enlarged plan view illustrating an example of an area D-2 of FIG. 16. FIG. 19 is an enlarged plan view illustrating an example of an area D-3 of FIG. 16.

For example, FIGS. 16 through 19 illustrate the (2-1)-th through (2-3)-th, (2-q)-th through (2-(q+2))-th, fifteenth, and sixteenth driving lines TL21 through TL23, TL2$q$ through TL2($q$+2) (where q is an integer satisfying 4≤q≤12), TL215, and TL216, the fourth guard line GL4, and the third ground line GRL3 in a part of the touch peripheral area TPA on the upper side of the touch sensor area TSA. For the convenience of description, only the driving electrodes TE at the upper ends of first through sixteenth columns of driving electrodes TE1 through TE16 are illustrated in FIG. 10. However, it is to be understood that various other elements may be present, as would be understood by one of ordinary skill in the art.

The exemplary embodiment of FIGS. 16 through 19 differs from the exemplary embodiment of FIGS. 10 through 13 in that the (2-1)-th through (2-3)-th, (2-q)-th through (2-(q+2))-th, fifteenth, and sixteenth driving lines TL21 through TL23, TL2$q$ through TL2($q$+2), TL215, and TL216, instead of the sensing lines RL, are designed in the differential line width expansion manner in the first region and in the identical line width expansion manner in the second and third regions. Thus, a detailed description of the exemplary embodiment of FIGS. 16 through 19 will be omitted. To the extent that a description of various details is omitted, the omitted details may be understood to be at least similar to those details already discussed with respect to corresponding elements.

According to the exemplary embodiment of FIGS. 16 through 19, the line width of the (2-1)-th through (2-3)-th, (2-q)-th through (2-(q+2))-th, fifteenth, and sixteenth driving lines TL21 through TL23, TL2$q$ through TL2($q$+2), TL215, and TL216 can be increased in proportion to the length of the (2-1)-th through (2-3)-th, (2-q)-th through (2-(q+2))-th, fifteenth, and sixteenth driving lines TL21 through TL23, TL2$q$ through TL2($q$+2), TL215, and TL216. Thus, the resistance of the (2-1)-th through (2-3)-th, (2-q)-th through (2-(q+2))-th, fifteenth, and sixteenth driving lines TL21 through TL23, TL2$q$ through TL2($q$+2), TL215, and TL216 can be made uniform as compared to a case where the (2-1)-th through (2-3)-th, (2-q)-th through (2-(q+2))-th, fifteenth, and sixteenth driving lines TL21 through TL23, TL2$q$ through TL2($q$+2), TL215, and TL216 are designed in the identical line width expansion manner in all the first, second, and third regions. Accordingly, differences in the speed at which the mutual capacitance of the touch electrodes (TE and RE) is charged by the driving signal can be reduced, and differences in mutual capacitance charge variations can be minimized. Therefore, the difference in touch sensitivity between the first column of driving electrodes TE1 to which the (2-1)-th driving line TL21 is connected and the sixteenth column of driving electrodes TE16 to which the (2-2)-th driving line TL22 is connected can be reduced. Referring to FIGS. 16 through 19, the first region may be the area D-1, the second region may be the area D-3, and the third region may be the area D-2.

Figure 20:
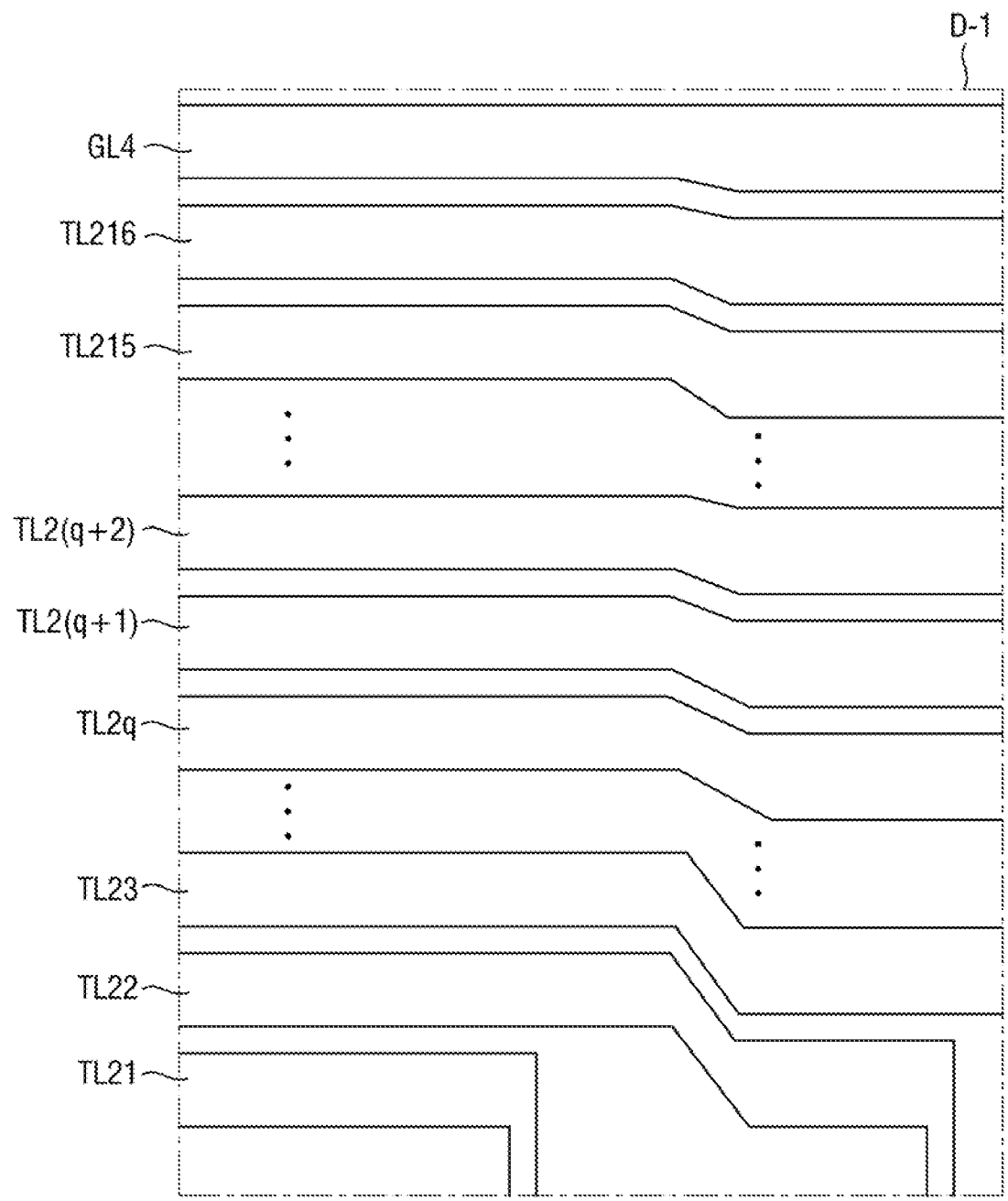
FIG. 20 is an enlarged plan view illustrating an example of the area D-1 of FIG. 16.

FIG. 20 is an enlarged plan view illustrating an example of the area D-1 of FIG. 16.

The exemplary embodiment of FIG. 20 differs from the exemplary embodiment of FIG. 17 in that in the first region, the (2-1)-th through (2-3)-th, (2-q)-th through (2-(q+2))-th, fifteenth, and sixteenth driving lines TL21 through TL23, TL2$q$ through TL2($q$+2), TL215, and TL216 are designed in the identical line width expansion manner, rather than in the differential line width expansion manner.

Referring to FIG. 20, in the first region of the touch peripheral area TPA, the (2-1)-th through (2-3)-th, (2-q)-th through (2-(q+2))-th, fifteenth, and sixteenth driving lines TL21 through TL23, TL2$q$ through TL2($q$+2), TL215, and TL216 may be designed to have the same width. Also, the (2-1)-th through (2-3)-th, (2-q)-th through (2-(q+2))-th, fifteenth, and sixteenth driving lines TL21 through TL23, TL2$q$ through TL2($q$+2), TL215, and TL216 may be designed to have their width expanded in accordance with a decrease in the number of driving lines TL. Accordingly, in the first region, the width of the (2-1)-th through (2-3)-th, (2-q)-th through (2-(q+2))-th, fifteenth, and sixteenth driving lines TL21 through TL23, TL2$q$ through TL2($q$+2), TL215, and TL216 may vary in a direction of the length of the (2-1)-th through (2-3)-th, (2-q)-th through (2-(q+2))-th, fifteenth, and sixteenth driving lines TL21 through TL23, TL2$q$ through TL2($q$+2), TL215, and TL216.

For example, referring to the area D-1 of FIG. 20, in a first column, the (2-1)-th, (2-2)-th, (2-3)-th, (2-q)-th, (2-(q+1))-th, (2-(q+2))-th, fifteenth, and sixteenth driving lines TL21, TL22, TL23, TL2$q$, TL2($q$+1), TL2($q$+2), TL215, and TL216 may have the same width. Also, in a second column, the (2-2)-th, (2-3)-th, (2-q)-th, (2-(q+1))-th, (2-(q+2))-th, fifteenth, and sixteenth driving lines TL21, TL22, TL23, TL2$q$, TL2($q$+1), TL2($q$+2), TL215, and TL216 may have the same width. Here, the first column refers to a column in which the (2-1)-th driving line TL21 is connected to the first column of driving electrodes TE1, and the second column refers to a column in which the (2-2)-th driving line TL22 is connected to the second column of driving electrodes TE2.

In the area D-1, since the (2-1)-th driving line TL21 is disposed in the first column, but not in the second column the number of driving lines TL disposed in the second column may be smaller than the number of driving lines TL disposed in the first column. Accordingly, the driving lines RL disposed in the second column in the second column may have a greater width than the (2-1)-th, (2-2)-th, (2-3)-th, (2-q)-th, (2-(q+1))-th, (2-(q+2))-th, fifteenth, and sixteenth driving lines TL21, TL22, TL23, TL2$q$, TL2($q$+1), TL2($q$+2), TL215, and TL216 in the first column.

Where in the area D-1, the (2-1)-th through (2-3)-th, (2-q)-th through (2-(q+2))-th, fifteenth, and sixteenth driving lines TL21 through TL23, TL2$q$ through TL2($q$+2), TL215, and TL216 are designed in the identical line width expansion method, rather than in the differential line width expansion method, as illustrated in FIG. 20, the resistance of the (2-1)-th driving line TL21, which is the shortest second driving line TL2, may vastly differ from the resistance of the (2-16)-th driving line TL216, which is the longest second driving line. Accordingly, in areas other than the area D-1, the (2-1)-th through (2-3)-th, (2-q)-th through (2-(q+2))-th, fifteenth, and sixteenth driving lines TL21 through TL23, TL2$q$ through TL2($q$+2), TL215, and TL216 may be designed to have different widths from one another, as illustrated in FIGS. 21 and 22.

Figure 21:
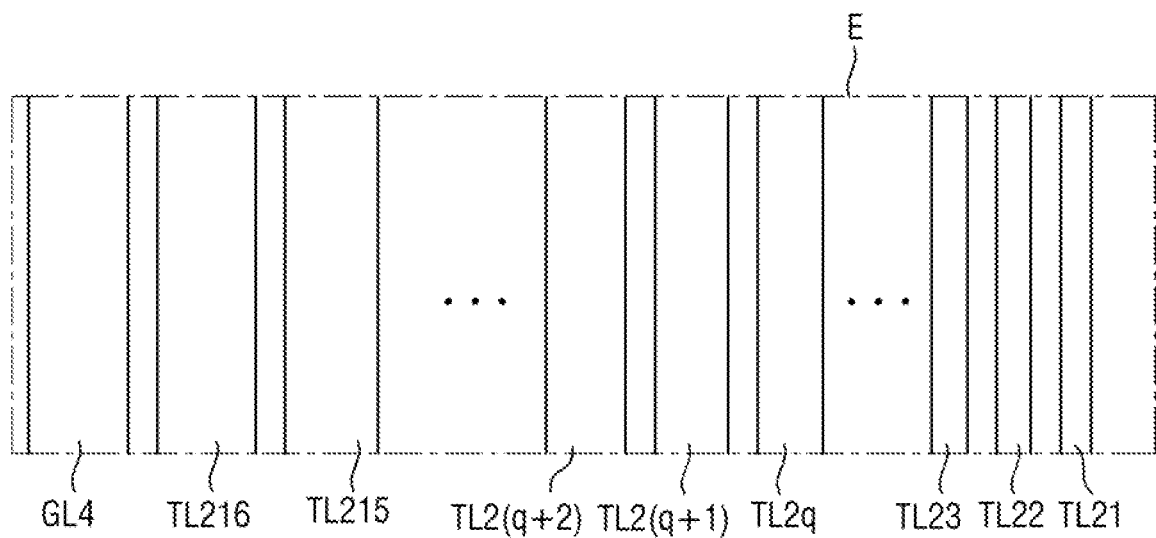
FIG. 21 is an enlarged plan view illustrating an example of an area E of FIG. 6.
Figure 22:
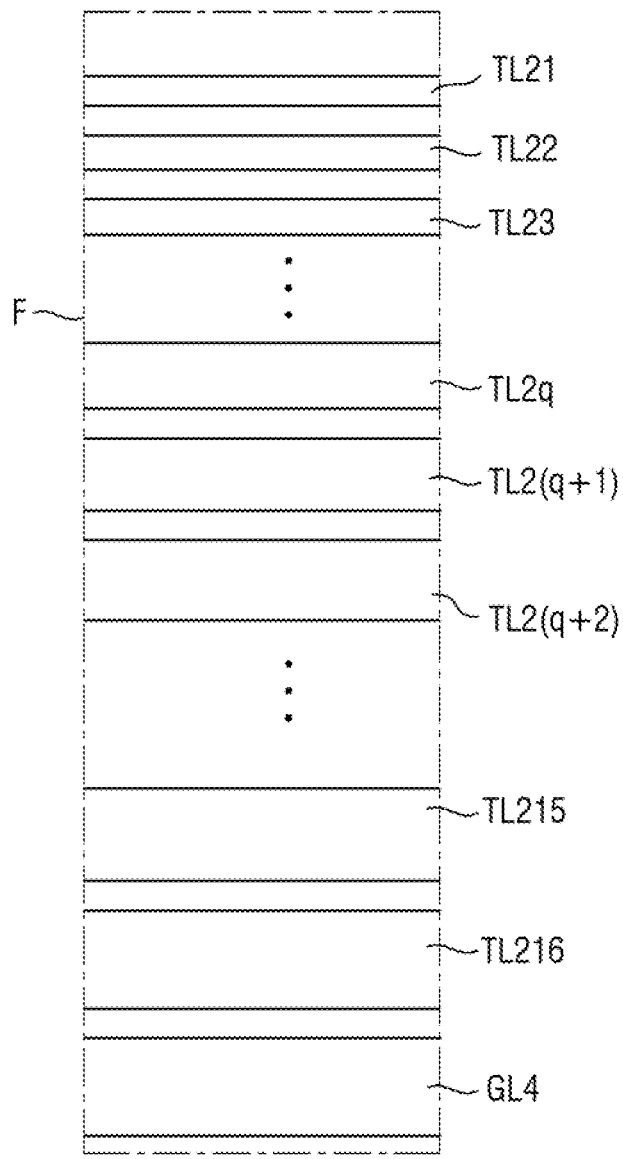
FIG. 22 is an enlarged plan view illustrating an example of an area F of FIG. 6.

FIG. 21 is an enlarged plan view illustrating an example of an area E of FIG. 6.

For example, FIG. 21 illustrates the (2-1)-th through (2-3)-th, (2-q)-th through (2-(q+2))-th, fifteenth, and sixteenth driving lines TL21 through TL23, TL2$q$ through TL2($q$+2) (where q is an integer satisfying 4≤q≤12), TL215, and TL216 and the fourth guard line GL4 in a part of the touch peripheral area TPA on the left side of the touch sensor area TSA.

Referring to FIG. 21, in the part of the touch peripheral area TPA on the left side of the touch sensor area TSA, the (2-1)-th through (2-3)-th, (2-q)-th through (2-(q+2))-th, fifteenth, and sixteenth driving lines TL21 through TL23, TL2$q$ through TL2($q$+2), TL215, and TL216 may have different widths. For example, in the area E, the (2-1)-th driving line TL21 may have a smallest width, and the (2-16)-th driving line TL216 may have a greatest width. The width of the second driving lines TL2 may gradually increase from that of the (2-1)-th driving line TL21, to that of the (2-16)-th driving line TL216. The (2-1)-th driving line TL21 corresponds to the innermost second driving line, and the (2-16)-th driving line TL216 corresponds to the outermost second driving line.

According to the exemplary embodiment of FIG. 21, the (2-1)-th through (2-3)-th, (2-q)-th through (2-(q+2))-th, fifteenth, and sixteenth driving lines TL21 through TL23, TL2$q$ through TL2($q$+2), TL215, and TL216 can be designed in the differential line width expansion manner in the area E, even when they are designed in the identical line width expansion method in the area D-1, as illustrated in FIG. 20. In this case, the resistance of the driving lines TL can be made uniform as compared to a case where in the area E, the (2-1)-th through (2-3)-th, (2-q)-th through (2-(q+2))-th, fifteenth, and sixteenth driving lines TL21 through TL23, TL2$q$ through TL2($q$+2), TL215, and TL216 are designed in the identical line width expansion manner. Accordingly, differences in the speed at which the mutual capacitance of the touch electrodes (TE and RE) is charged by the driving signal can be reduced, and differences in mutual capacitance charge variations can be minimized. Therefore, the difference in touch sensitivity between the first column of driving electrodes TE1 to which the (2-1)-th driving line TL21 is connected and the sixteenth column of driving electrodes TE16 to which the (2-2)-th driving line TL22 is connected can be reduced.

Also, as the size of the area E increases, the resistance of the (2-1)-th and (2-2)-th driving lines TL21 and TL22 may become higher than the resistance of the (2-15)-th and (2-16)-th driving lines TL215 and TL216. Accordingly, the size of the area E may be set in consideration of the resistance of the (2-1)-th through (2-3)-th, (2-q)-th through (2-(q+2))-th, fifteenth, and sixteenth driving lines TL21 through TL23, TL2$q$ through TL2($q$+2), TL215, and TL216.

FIG. 22 is an enlarged plan view illustrating an example of an area F of FIG. 6.

For example, FIG. 22 illustrates the (2-1)-th through (2-3)-th, (2-q)-th through (2-(q+2))-th, fifteenth, and sixteenth driving lines TL21 through TL23, TL2$q$ through TL2($q$+2) (where q is an integer satisfying 4≤q≤12), TL215, and TL216 and the fourth guard line GL4 in a part of the touch peripheral area TPA on the lower left side of the touch sensor area TSA.

Referring to FIG. 22, in the part of the touch peripheral area TPA on the lower left side of the touch sensor area TSA, the (2-1)-th through (2-3)-th, (2-q)-th through (2-(q+2))-th, fifteenth, and sixteenth driving lines TL21 through TL23, TL2$q$ through TL2($q$+2), TL215, and TL216 may have different widths. For example, in the area F, the (2-1)-th driving line TL21 may have a smallest width, and the (2-16)-th driving line TL216 may have a greatest width. The width of the second driving lines TL2 may gradually increase from that of the (2-1)-th driving line TL21 to that of the (2-16)-th driving line TL216. The (2-1)-th driving line TL21 corresponds to the innermost second driving line, and the (2-16)-th driving line TL216 corresponds to the outermost second driving line.

According to the exemplary embodiment of FIG. 22, the (2-1)-th through (2-3)-th, (2-q)-th through (2-(q+2))-th, fifteenth, and sixteenth driving lines TL21 through TL23, TL2$q$ through TL2($q$+2), TL215, and TL216 can be designed in the differential line width expansion manner in the area F, even when they are designed in the identical line width expansion method in the area D-L, as illustrated in FIG. 20. In this case, the resistance of the driving lines TL can be made uniform as compared to a case where in the area F, the (2-1)-th through (2-3)-th, (2-q)-th through (2-(q+2))-th, fifteenth, and sixteenth driving lines TL21 through TL23, TL2$q$ through TL2($q$+2), TL215, and TL216 are designed in the identical line width expansion manner. Accordingly, differences in the speed at which the mutual capacitance of the touch electrodes (TE and RE) is charged by the driving signal can be reduced, and differences in mutual capacitance charge variations can be minimized. Therefore, the difference in touch sensitivity between the first column of driving electrodes TE1 to which the (2-1)-th driving line TL21 is connected and the sixteenth column of driving electrodes TE16 to which the (2-2)-th driving line TL22 is connected can be reduced.

Figure 23:
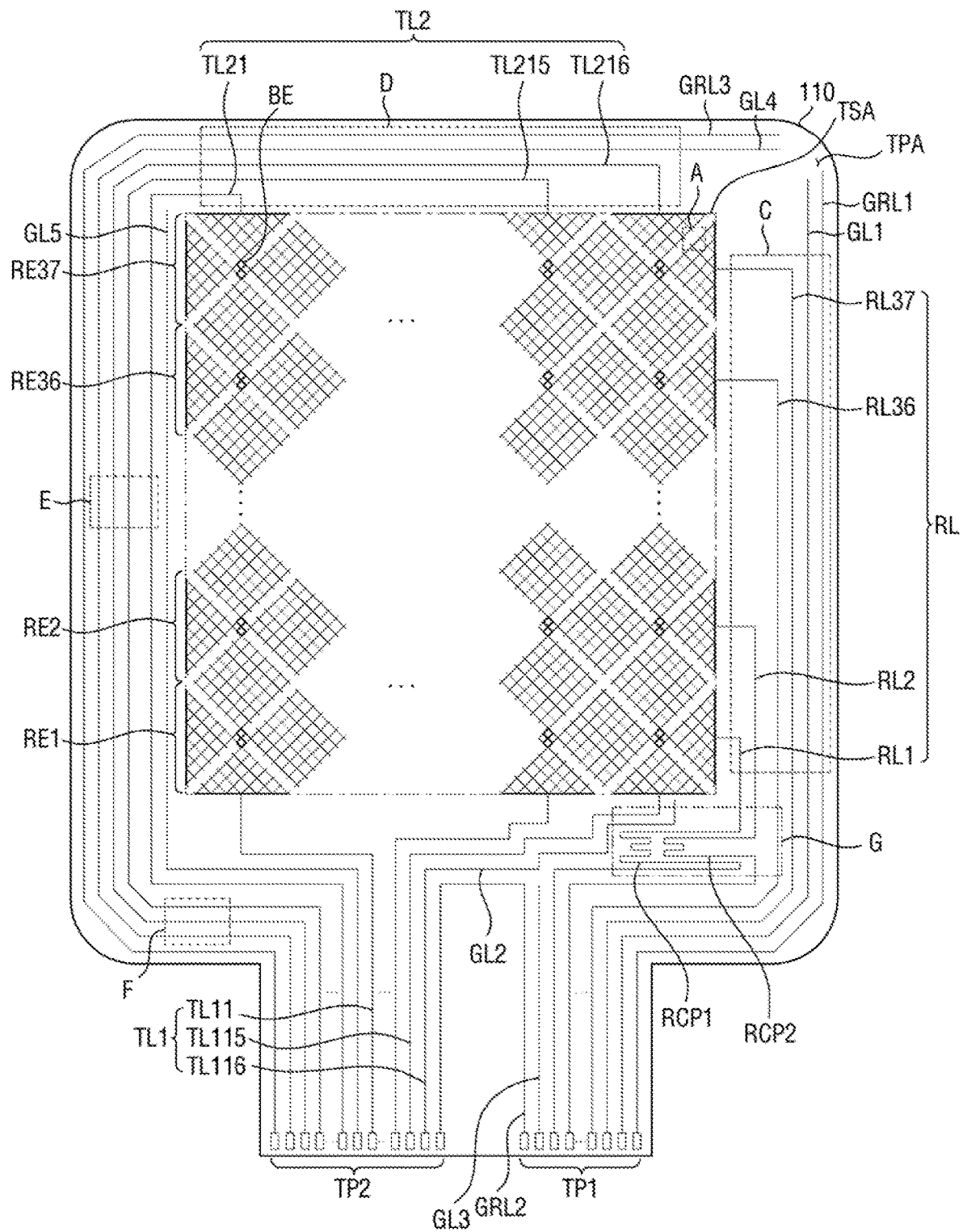
FIG. 23 is a plan view illustrating an example of the touch sensing unit of FIG. 4.
Figure 24:
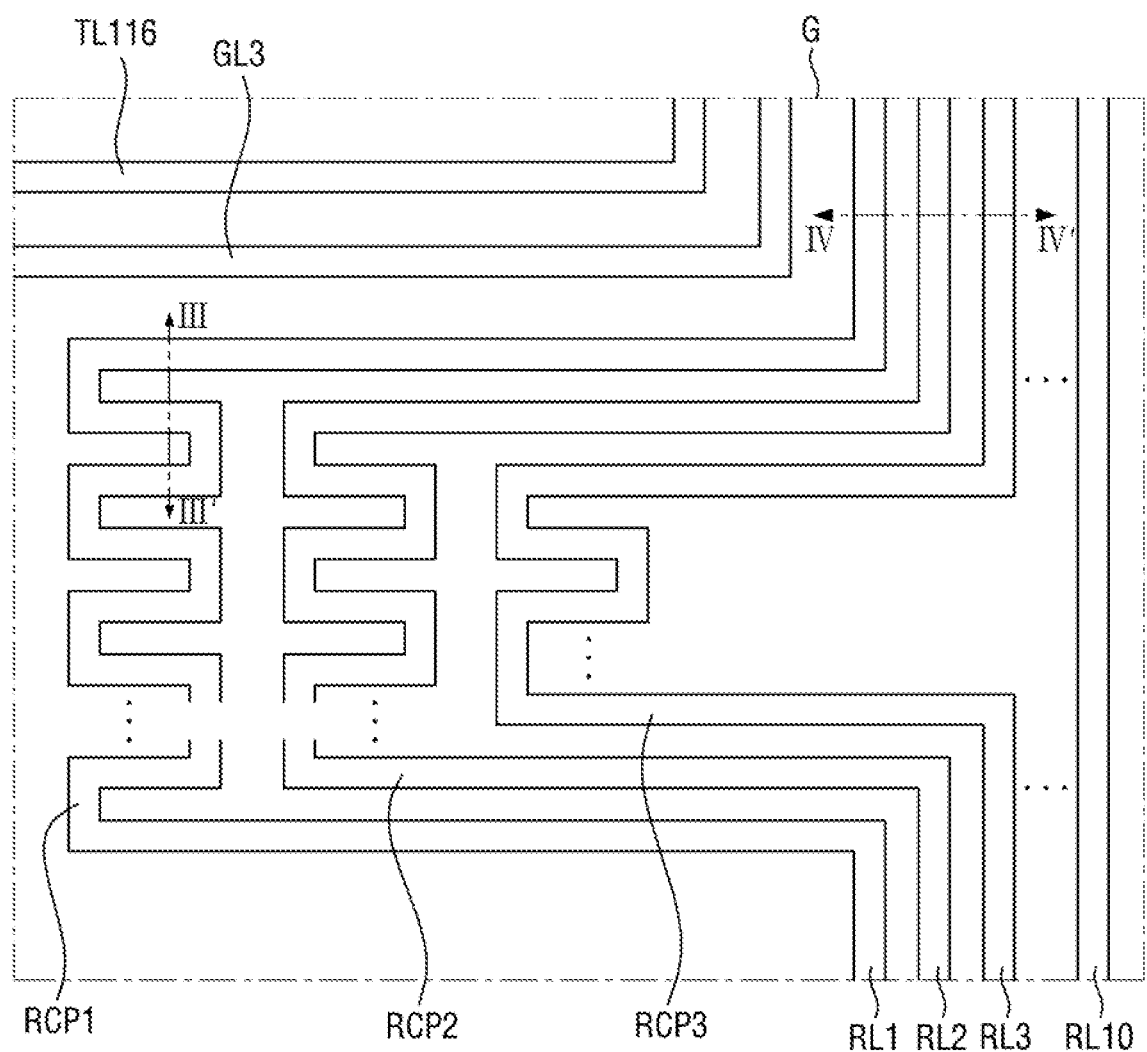
FIG. 24 is an enlarged plan view illustrating an example of an area G of FIG. 23.

FIG. 23 is a plan view illustrating an example of the touch sensing unit of FIG. 4. FIG. 24 is an enlarged plan view illustrating an example of an area G of FIG. 23.

The exemplary embodiment of FIGS. 23 and 24 differs from the exemplary embodiment of FIG. 6 in that the first, second, and third sensing lines RL1, RL2, and RL3 include first, second, and third resistance compensating patterns RCP1, RCP2, and RCP3, respectively. The exemplary embodiment of FIGS. 23 and 24 will hereinafter be described, focusing mainly on the differences with the exemplary embodiment of FIG. 6. To the extent that a description of various details is omitted, the omitted details may be understood to be at least similar to those details already discussed with respect to corresponding elements.

In the exemplary embodiment of FIG. 6, the resistance of the first through ninth sensing lines RL1 through RL9 is lower than the resistance of the tenth through thirty seventh sensing lines RL10 through RL37. Thus, the resistance of the first through ninth sensing lines RL1 through RL9 needs to be raised to make the resistance of the sensing lines RL uniform.

Figure 14:
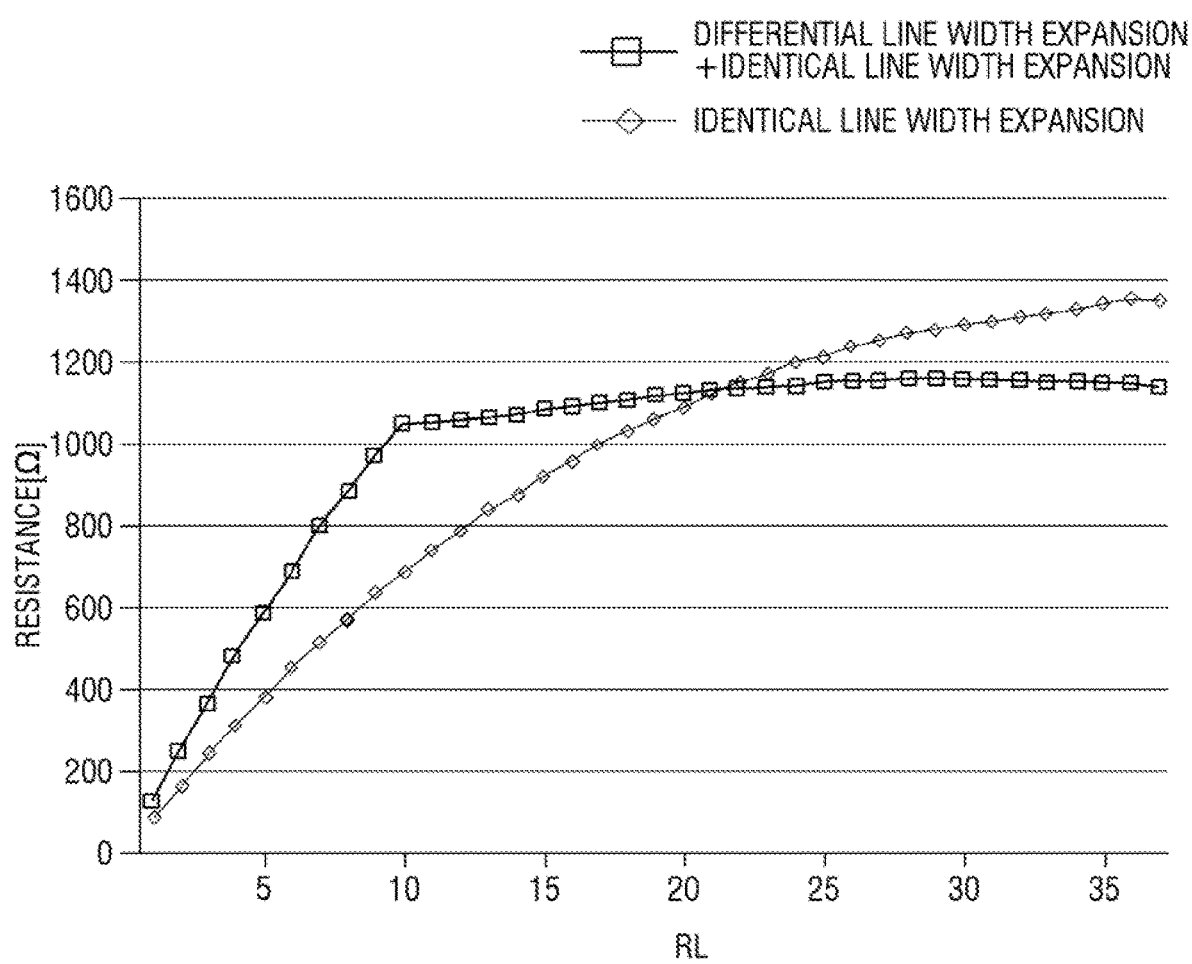
FIG. 14 is a graph showing the resistances of first through thirty seventh sensing lines according to an exemplary embodiment of the present disclosure.
Figure 26:
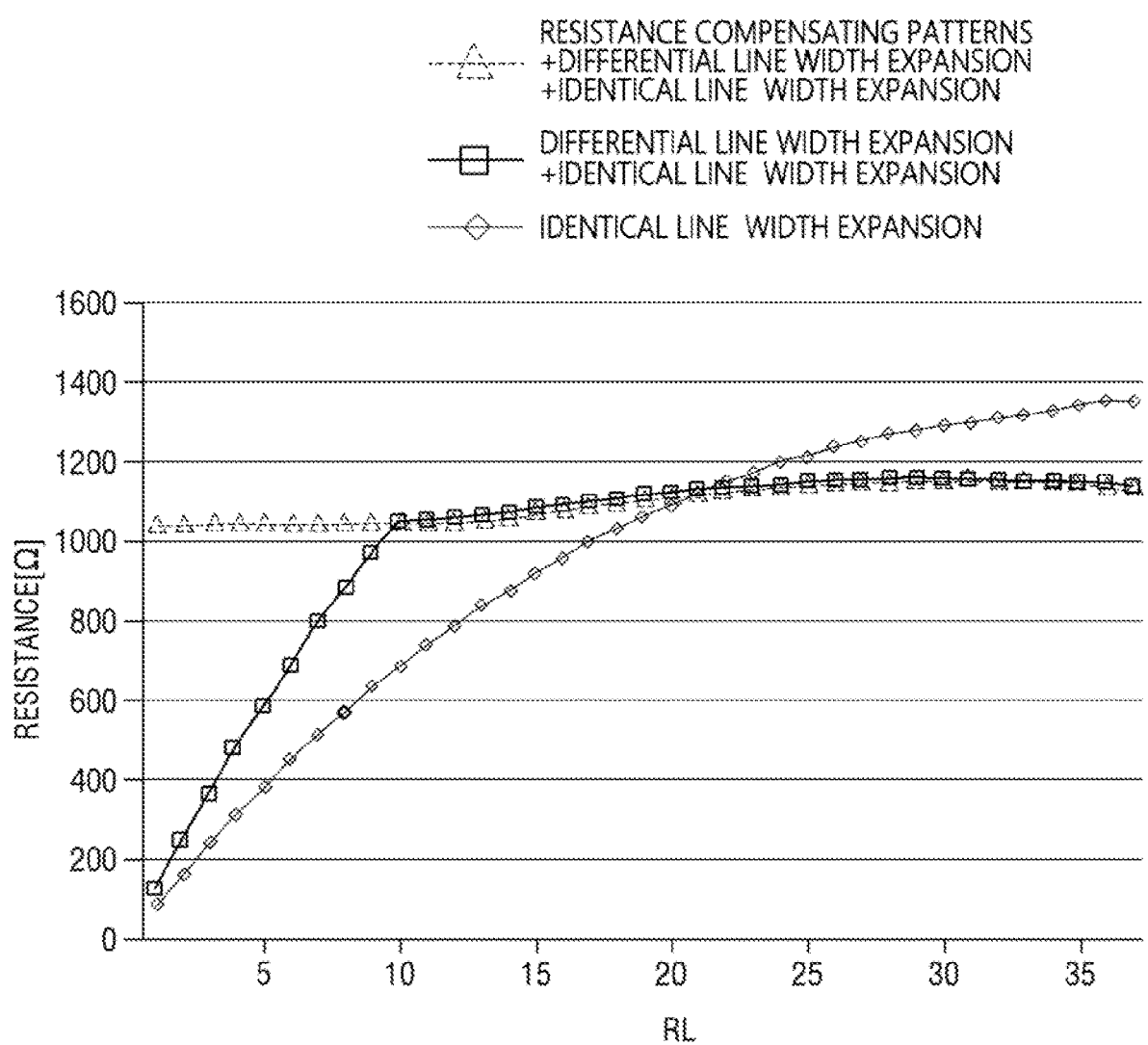
FIG. 26 is a graph showing the resistances of the first through thirty seventh sensing lines according to an exemplary embodiment of the present disclosure.

Referring to FIGS. 23 and 24, since innermost sensing lines RL, for example, the first, second, and third sensing lines RL1, RL2, and RL3, are relatively short, the resistance of the first through ninth sensing lines RL1 through RL9 is lower than the resistance of the tenth through thirty seventh sensing lines RL10 through RL37, as illustrated in FIG. 14, even if in the area C-1, the first through third, p-th through (p+2)-th, thirty sixth, and thirty seventh sensing lines RL1 through RL3, RLp through RLp+2, RL36, and RL37 are designed in the differential line width expansion manner. Thus, by using resistance compensating patterns to increase the resistance of the first through ninth sensing lines RL1 through RL9, the resistance of the sensing lines RL can be made uniform, as illustrated in FIG. 26. For the convenience of description, FIGS. 23 and 24 illustrate each of the first, second, and third sensing lines RL1, RL2, and RL3 as including a resistance compensating pattern, but the present disclosure is not limited thereto. However, it is to be understood that various other elements may be present, as would be understood by one of ordinary skill in the art.

The first, second, and third resistance compensating patterns RCP1, RCP2, and RCP3 may be formed as winding patterns. The length of a resistance compensating pattern of a sensing line RL may be inversely proportional to the length of the entire sensing line RL excluding the resistance compensating pattern. For example, since the first sensing line RL1 excluding the first resistance compensating pattern RCP1 has a smallest length, the first resistance compensating pattern RCP1 has a greatest length. Also, since the third sensing line RL3 excluding the third resistance compensating pattern RCP3 has a greatest length, the third resistance compensating pattern RCP3 has a smallest length. In short, the length of the resistance compensating patterns of the sensing lines RL may gradually decrease from that of the first resistance compensating pattern RCP1 to that of the third resistance compensating pattern RCP3.

The first, second, and third resistance compensating patterns RCP1, RCP2, and RCP3 may be disposed in a space between the third guard line GL3 and the first sensing line RL1. The first resistance compensating pattern RCP1 may be disposed to surround the second resistance compensating pattern RCP2, and the second resistance compensating pattern RCP2 may be disposed to surround the third resistance compensating pattern RCP3.

Figure 25:
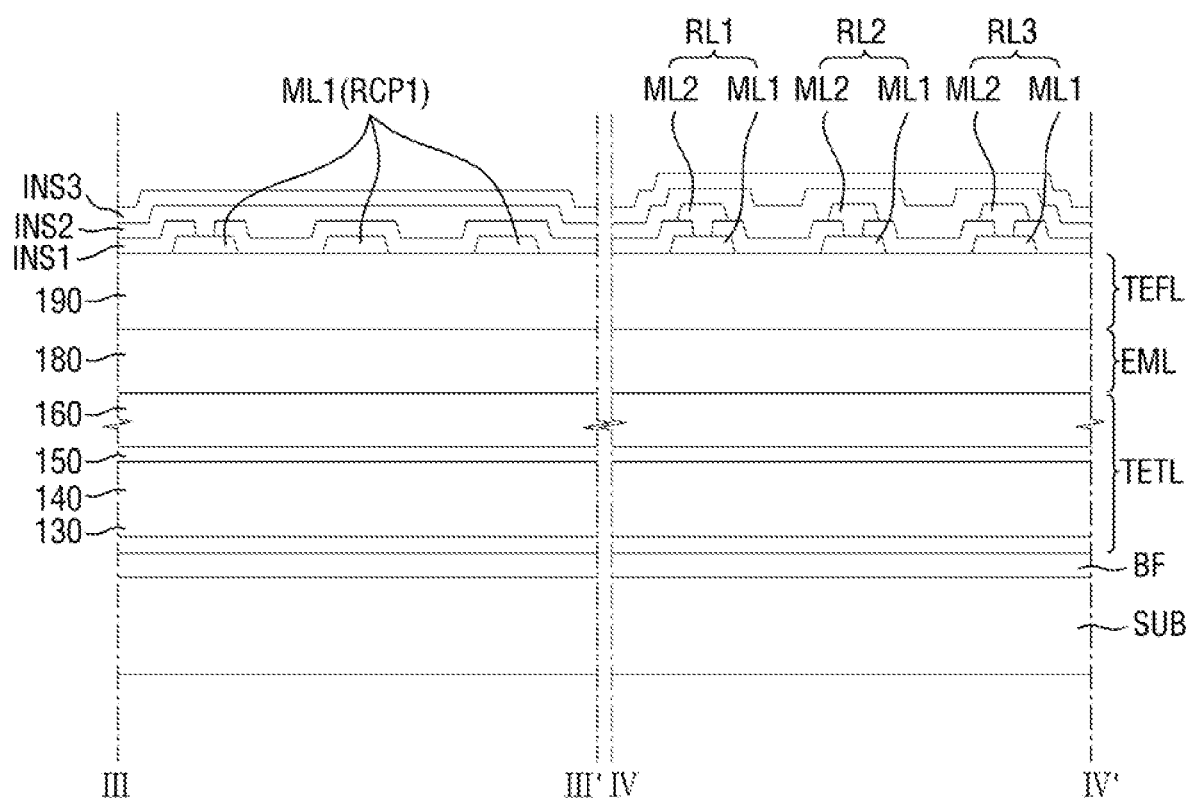
FIG. 25 is a cross-sectional view taken along lines III-III' and IV-IV' of FIG. 24.

To enhance the resistance compensation effect of the first resistance compensating pattern RCP1, the first resistance compensating pattern RCP1 may be thinner than the rest of the first sensing line RL1. For example, referring to FIG. 25, the first resistance compensating pattern RCP1 may include only a first metal layer ML1, but the rest of the first sensing line RL1 may include both the first metal layer ML1 and a second metal layer ML2. The first and second metal layers ML1 and ML2 may include a stack of Al and Ti (e.g., Ti/Al/Ti), a stack of Al and ITO (e.g., ITO/Al/ITO), an APC alloy, or a stack of an APC alloy and ITO (e.g., ITO/APC/ITO), but the present disclosure is not limited thereto.

According to the exemplary embodiment of FIGS. 23 and 24, the uniformity of the resistance of the sensing lines RL can be increased by raising the resistance of innermost sensing lines RL using resistance compensating patterns such as the first, second, and third resistance compensating patterns RCP1, RCP2, and RCP3.

Figure 27:
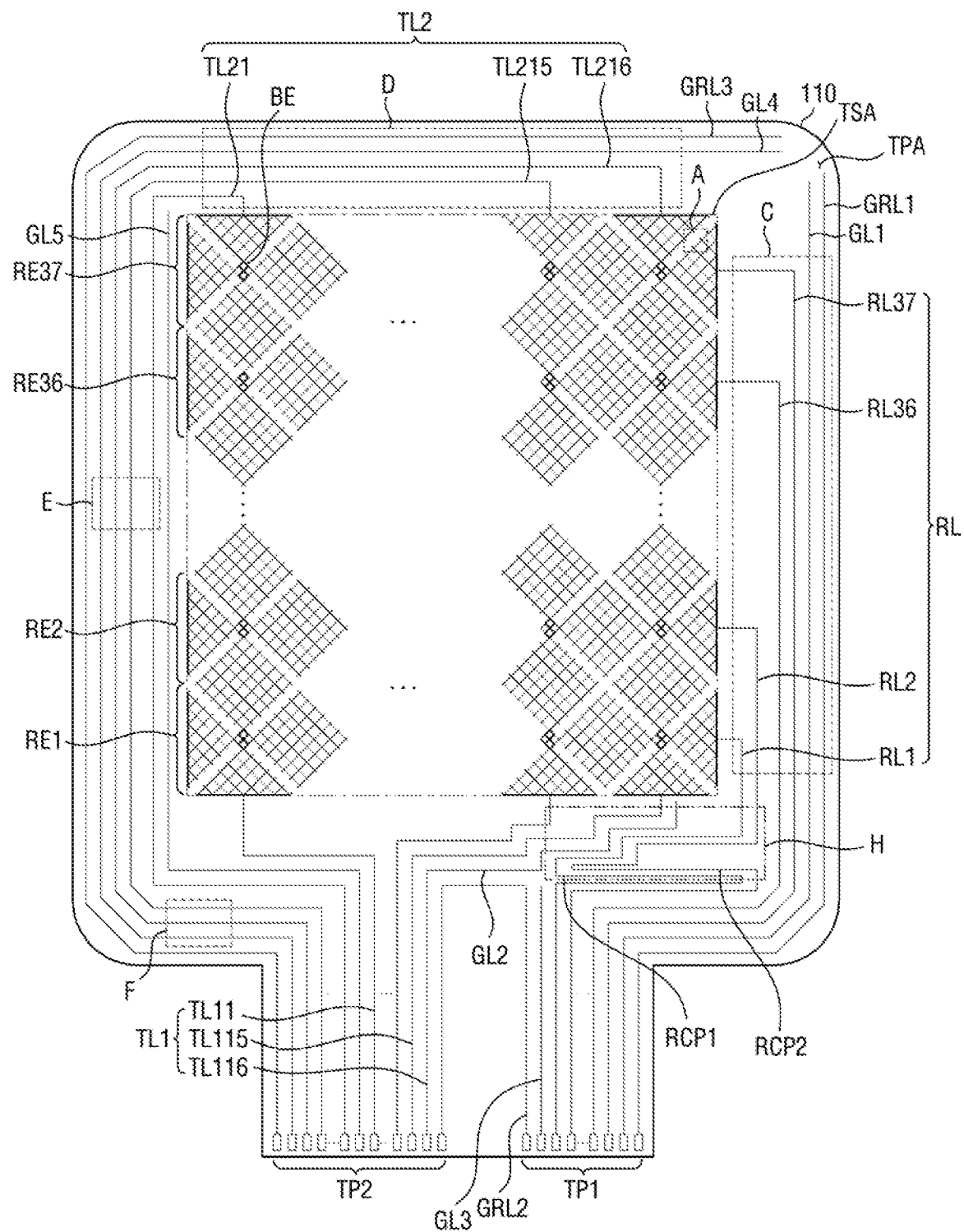
FIG. 27 is a plan view illustrating an example of the touch sensing unit of FIG. 4.
Figure 28:
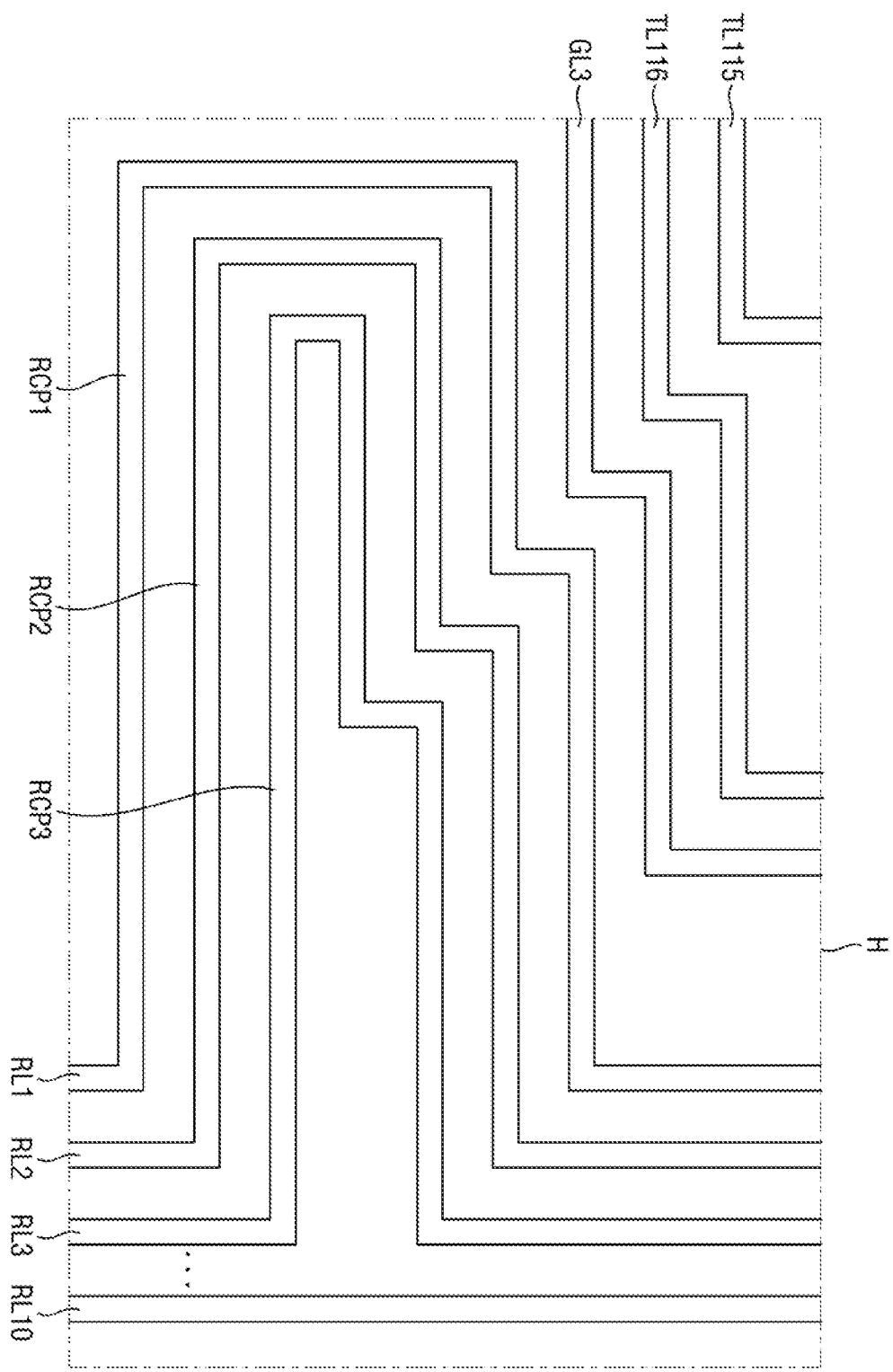
FIG. 28 is an enlarged plan view of an example of an area H of FIG. 27.

FIG. 27 is a plan view illustrating an example of the touch sensing unit of FIG. 4. FIG. 28 is an enlarged plan view of an example of an area H of FIG. 27.

The exemplary embodiment of FIGS. 27 and 28 differs from the exemplary embodiment of FIGS. 23 and 24 in that first, second, and third resistance compensating patterns RCP1, RCP2, and RCP3 are formed, but not as winding patterns.

For example, if the first, second, and third resistance compensating patterns RCP1, RCP2, and RCP3 are formed as winding patterns, as illustrated in FIGS. 23 and 24, the density of a metal layer may be higher in a region where the first, second, and third resistance compensating patterns RCP1, RCP2, and RCP3 are disposed than in other regions. As a result, external light is more likely to be reflected in the region where the first, second, and third resistance compensating patterns RCP1, RCP2, and RCP3 are disposed than in other regions. Accordingly, the region where the first, second, and third resistance compensating patterns RCP1, RCP2, and RCP3 are disposed may appear brighter than other regions to a user.

To address this problem, the first, second, and third resistance compensating patterns RCP1, RCP2, and RCP3 may be formed, but not as winding patterns, as illustrated in FIGS. 27 and 28. For example, the first, second, and third resistance compensating patterns RCP1, RCP2, and RCP3 may be disposed in a space defined by the second guard line GL2 and the first sensing line RL1. Here, the first resistance compensating pattern RCP1 may be at least partially surrounded by the second guard line GL2 and the first sensing line RL1. The second resistance compensating pattern RCP2 may be at least partially surrounded by the first resistance compensating pattern RCP1. The third resistance compensating pattern RCP3 may be at least partially surrounded by the second resistance compensating pattern RCP2.

Although the preferred embodiments of the present invention have been disclosed for illustrative purposes, those skilled in the art will appreciate that various modifications, additions and substitutions are possible, without departing from the scope and spirit of the present disclosure.

What is claimed is:

1. A touch sensing unit, comprising:
   a first touch electrode disposed in a touch sensor area;
   a second touch electrode disposed in the touch sensor area;
   a first touch line disposed in a touch peripheral area, the first touch line being electrically connected to the first touch electrode, wherein the touch peripheral area is disposed on a periphery of the touch sensor area; and
   a second touch line disposed in the touch peripheral area, the second touch line being electrically connected to the second touch electrode,
   wherein the touch peripheral area includes a first region, a second region, and a third region, and the second region is between the first region and the third region,
   wherein in the first region, a width of the first touch line is smaller than a width of the second touch line,
   wherein each of a width of the first touch line and a width of the second touch line increases from the first region to the third region, and
   wherein a width of the first touch line is substantially the same as a width of the second touch line in the second region and the third region.

2. The touch sensing unit of claim 1, wherein a length of the second touch line is greater than a length of the first touch line.

3. The touch sensing unit of claim 1, wherein the first touch line is closer than the second touch line to the touch sensor area.

4. The touch sensing unit of claim 1, wherein the first and second touch lines are connected to first touch pads in the touch peripheral area, and the first region is closer than the second region to the first touch pads.

5. The touch sensing unit of claim 4, wherein widths of the first and second touch lines increase away from the first touch pads.

6. The touch sensing unit of claim 4, wherein the touch peripheral area further includes a third region that is farther than the second region from the first touch pads, and in the third region, a width of the first touch line is equal to a width of the second touch line.

7. The touch sensing unit of claim 6, wherein the first and second regions are disposed on a common side of the touch sensor area and in a fourth region, that is disposed on an opposite side of the touch sensor area from the first and second regions, widths of the first and second touch lines are equal.

8. The touch sensing unit of claim 1, further comprising:
a third touch electrode disposed in the touch sensor area; and
a third touch line disposed in the touch peripheral area, the third touch line being electrically connected to the third touch electrode, and arranged between the first and second touch lines.

9. The touch sensing unit of claim 8, wherein in the first region, a width of the third touch line is greater than a width of the first touch line and the width of the third touch line is smaller than a width of the second touch line, and in the second region, widths of the first, second, and third touch lines are all equal to each other.

10. The touch sensing unit of claim 8, wherein in the first region, a width of the third touch line is equal to a width of the first touch line, and in the second region, the width of the first touch line, a width of the second touch line, and the width of the third touch lines are all equal to each other.

11. The touch sensing unit of claim 8, further comprising:
a fourth touch electrode disposed in the touch sensor area; and
a fourth touch line disposed in the touch peripheral area, the fourth touch line being electrically connected to the fourth touch electrode,
wherein the fourth touch line is closer to the touch sensor area than the first and second touch lines are.

12. The touch sensing unit of claim 11, wherein the fourth touch line is disposed in the first region and not in the second region.

13. The touch sensing unit of claim 12, wherein in the first region, a width of the fourth touch line is smaller than a width of the first touch line.

14. The touch sensing unit of claim 11, wherein the fourth touch line includes a resistance compensating pattern.

15. The touch sensing, unit of claim 14, wherein a thickness of the resistance compensating pattern is smaller than a minimum thickness of a remainder of the fourth touch line.

16. The touch sensing unit of claim 1, wherein the first and second regions are disposed on a common side of the touch sensor area.

17. The touch sensing unit of claim 1, further comprising:
a first guard line disposed in the touch peripheral area,
wherein the second touch line is closer than the first guard line to the touch sensor area.

18. The touch sensing unit of claim 17, wherein in the first and second regions, a width of the first guard line and a width of the second touch line are equal.

19. The touch sensing unit of claim 17, further comprising:
a first ground line disposed in the touch peripheral area,
wherein the first guard line is closer than the first ground line to the touch sensor area.

20. A touch sensing unit, comprising:
a first touch electrode disposed in a touch sensor area;
a second touch electrode disposed in the touch sensor area;
a first touch line disposed in a touch peripheral area, the first touch line being electrically connected to the first touch electrode, wherein the touch peripheral area is disposed on a periphery of the touch sensor area;
a second touch line disposed in the touch peripheral area, the second touch line being electrically connected to the second touch electrode;
a first guard line disposed in the touch peripheral area; and
a first ground line disposed in the touch peripheral area,
wherein the touch peripheral area includes first and second regions,
wherein in the first region, a width of the first touch line is smaller than a width of the second touch line,
wherein in the second region, a width of the first touch line is equal to a width of the second touch line,
wherein the second touch line is closer than the first guard line to the touch sensor area,
wherein the first guard line is closer than the first ground line to the touch sensor area, and
wherein in a first driving mode, a ground voltage is applied to the first guard line and the first ground line, and a driving signal having multiple driving pulses is applied to the first and second touch lines.

21. The touch sensing unit of claim 20, wherein in a second driving mode, the around voltage is applied to the first guard line, and the driving signal having multiple driving pulses is applied to the first ground line and the first and second touch lines.

22. The touch sensing unit of claim 21, wherein a driving voltage applied to the first guard line is equal to a driving voltage applied to the second touch line.

23. A display device, comprising:
a substrate;
a light-emitting element layer disposed on the substrate and including a plurality of organic light-emitting elements;
a thin-film encapsulation layer disposed on the light-emitting element layer; and
a touch sensor layer disposed on the thin-film encapsulation layer,
wherein the touch sensor layer includes sensing electrodes disposed in a touch sensor area and sensing lines disposed in a touch peripheral area, the sensing lines being electrically connected to the sensing electrodes, the touch peripheral area being disposed on a periphery of the touch sensor area,
wherein a width of each of the sensing lines increases away from the touch sensor area,
wherein the sensing lines include a first sensing line connected to a first sensor electrode disposed in a first row among the sensor electrodes, a second sensing line connected to a second sensor electrode disposed in a second row among the sensor electrodes, a third sensing line connected to a third sensor electrode disposed in a first column among the sensor electrodes, and a fourth sensing line connected to a fourth sensor electrode disposed in a second column among the sensor electrode, and wherein a width of the first sensing line is smaller than a width of the second sensing line, wherein the touch peripheral area includes a first region, a second region, and a third region, and the second region is between the first region and the third region, wherein the width of the first sensing line varies in a length direction of the first sensing line in the first and second regions, wherein the width of the second sensing line varies in a length direction of the second sensing line in the first and second regions, wherein a width of the first sensing line is equal to a width of the second sensing line in the second region and the third region, and wherein the first and second regions are disposed on a common side of the touch sensor area and in a fourth region that is disposed on an opposite side of the touch sensor area from the first and second regions, widths of the third and fourth touch lines are different from each other, and wherein charge variations are sensed through the first and second touch lines, and a driving voltage is applied to the third and fourth touch lines.

* * * * *